United States Patent
Lemay et al.

(10) Patent No.: US 10,323,701 B2
(45) Date of Patent: Jun. 18, 2019

(54) RENDERING ROAD SIGNS DURING NAVIGATION

(71) Applicant: Apple Inc., Cupertino, CA (US)

(72) Inventors: Stephen O. Lemay, San Francisco, CA (US); Seejo K. Pylappan, Cupertino, CA (US); Marcel Van Os, San Francisco, CA (US); Harold O. Habeck, Mountain View, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/919,767

(22) Filed: Mar. 13, 2018

(65) Prior Publication Data

US 2018/0274603 A1  Sep. 27, 2018

Related U.S. Application Data

(60) Continuation of application No. 14/611,157, filed on Jan. 30, 2015, now Pat. No. 10,006,505, which is a
(Continued)

(51) Int. Cl.
*G01C 21/32* (2006.01)
*G01C 21/34* (2006.01)
(Continued)

(52) U.S. Cl.
CPC ............ *F16D 41/063* (2013.01); *G01C 21/32* (2013.01); *G01C 21/34* (2013.01);
(Continued)

(58) Field of Classification Search
CPC .............. F16D 41/063; G01C 21/3635; G01C 21/3632; G01C 21/32; G01C 21/34;
(Continued)

(56) References Cited

U.S. PATENT DOCUMENTS 4,797,836 A  1/1989  Witek et al.
4,914,605 A  4/1990  Loughmiller et al.
(Continued)

FOREIGN PATENT DOCUMENTS

AU  2013272003 A1  12/2014
AU  2016213819 A1  9/2016
(Continued)

OTHER PUBLICATIONS

Rich Brooks How to Write a Review at Google Maps 2009 12 pages.
(Continued)

*Primary Examiner* — Thomas Ingram
(74) *Attorney, Agent, or Firm* — Invoke

(57) ABSTRACT

Some embodiments of the invention provide a navigation application that presents road signs during a navigation presentation. In presenting the road signs, the application of some embodiments differentiates the appearance of road signs at junctions that require a change of direction from road signs at junctions that do not require a change of direction. The application may perform processes that ensure that it arranges the road signs on the map in an aesthetically pleasing manner. In addition, the navigation application of some embodiments does not display too many road signs along the navigated route so that the route is not by occluded by too many road signs.

20 Claims, 16 Drawing Sheets

Related U.S. Application Data division of application No. 13/632,029, filed on Sep. 30, 2012, now Pat. No. 9,482,296.

(60) Provisional application No. 61/699,851, filed on Sep. 11, 2012, provisional application No. 61/656,032, filed on Jun. 6, 2012, provisional application No. 61/656,043, filed on Jun. 6, 2012, provisional application No. 61/657,864, filed on Jun. 10, 2012, provisional application No. 61/657,880, filed on Jun. 10, 2012, provisional application No. 61/699,754, filed on Sep. 11, 2012, provisional application No. 61/655,997, filed on Jun. 5, 2012, provisional application No. 61/699,855, filed on Sep. 11, 2012.

(51) Int. Cl.
*G01C 21/36* (2006.01)
*G06T 11/60* (2006.01)
*F16D 41/063* (2006.01)

(52) U.S. Cl.
CPC ..... *G01C 21/3626* (2013.01); *G01C 21/3632* (2013.01); *G01C 21/3635* (2013.01); *G01C 21/3667* (2013.01); *G01C 21/3673* (2013.01); *G06T 11/60* (2013.01); *G01C 21/3638* (2013.01)

(58) Field of Classification Search
CPC ............ G01C 21/3626; G01C 21/3673; G01C 21/3667; G01C 21/3638; G06T 11/60
See application file for complete search history.

(56) References Cited

U.S. PATENT DOCUMENTS

| | | | |
|---|---|---|---|
| 5,289,572 A | 2/1994 | Yano et al. | |
| 5,321,161 A | 6/1994 | Vreugdenhil et al. | |
| 5,353,319 A | 10/1994 | Challberg | |
| 5,359,712 A | 10/1994 | Cohen et al. | |
| 5,406,492 A | 4/1995 | Suzuki | |
| 5,459,667 A * | 10/1995 | Odagaki | G01C 21/30 340/995.19 |
| 5,459,702 A | 10/1995 | Greenspan | |
| 5,592,173 A | 1/1997 | Lau et al. | |
| 5,629,854 A | 5/1997 | Schulte | |
| 5,654,892 A | 8/1997 | Fujii et al. | |
| 5,692,173 A | 11/1997 | Chew | |
| 5,717,848 A | 2/1998 | Watanabe et al. | |
| 5,787,233 A | 7/1998 | Akimoto | |
| 5,848,375 A | 12/1998 | Nunobiki et al. | |
| 5,862,511 A | 1/1999 | Croyle et al. | |
| 5,878,368 A | 3/1999 | Degraaf | |
| 5,913,918 A | 6/1999 | Nakano et al. | |
| 5,966,129 A | 10/1999 | Matsukuma et al. | |
| 5,990,898 A | 11/1999 | Urano | |
| 6,029,111 A | 2/2000 | Croyle | |
| 6,102,253 A | 8/2000 | Gallina et al. | |
| 6,107,961 A | 8/2000 | Takagi | |
| 6,141,568 A | 10/2000 | Sakaguchi | |
| 6,141,588 A | 10/2000 | Cox et al. | |
| 6,153,269 A | 11/2000 | Gleason et al. | |
| 6,163,269 A | 12/2000 | Millington et al. | |
| 6,173,232 B1 | 1/2001 | Nanba et al. | |
| 6,176,380 B1 | 1/2001 | Glories et al. | |
| 6,178,380 B1 | 1/2001 | Millington | |
| 6,202,026 B1 | 3/2001 | Nimura et al. | |
| 6,253,151 B1 | 6/2001 | Ohler et al. | |
| 6,259,446 B1 | 7/2001 | Matheny et al. | |
| 6,295,503 B1 | 9/2001 | Inoue et al. | |
| 6,311,125 B1 | 10/2001 | Okano et al. | |
| 6,321,158 B1 | 11/2001 | Delorme et al. | |
| 6,321,161 B1 | 11/2001 | Herbst et al. | |
| 6,360,167 B1 | 3/2002 | Millington et al. | |
| 6,363,145 B1 | 3/2002 | Shaffer et al. | |
| 6,363,322 B1 | 3/2002 | Millington | |
| 6,374,180 B1 | 4/2002 | Slominski et al. | |
| 6,381,534 B2 | 4/2002 | Takayama et al. | |
| 6,396,475 B1 | 5/2002 | Ellenby et al. | |
| 6,434,482 B1 | 8/2002 | Oshida et al. | |
| 6,480,783 B1 | 11/2002 | Myr | |
| 6,487,305 B2 | 11/2002 | Kambe et al. | |
| 6,496,189 B1 | 12/2002 | Yaron et al. | |
| 6,526,335 B1 | 2/2003 | Treyz et al. | |
| 6,538,655 B1 | 3/2003 | Kubota | |
| 6,539,300 B2 | 3/2003 | Myr | |
| 6,577,946 B2 | 6/2003 | Myr | |
| 6,587,784 B1 | 7/2003 | Okude et al. | |
| 6,597,354 B2 | 7/2003 | Sakamoto et al. | |
| 6,597,654 B2 | 7/2003 | Tosaki et al. | |
| 6,598,016 B1 | 7/2003 | Zavoli et al. | |
| 6,600,654 B2 | 7/2003 | Loebach | |
| 6,615,130 B2 | 9/2003 | Myr | |
| 6,654,024 B1 | 11/2003 | Voelkel | |
| 6,693,564 B2 | 2/2004 | Niitsuma | |
| 6,704,645 B1 | 3/2004 | Beesley et al. | |
| 6,710,774 B1 | 3/2004 | Kawasaki et al. | |
| 6,792,349 B1 | 9/2004 | Chen et al. | |
| 6,891,525 B2 | 5/2005 | Ogoro | |
| 6,972,757 B2 | 12/2005 | Arikawa et al. | |
| 7,054,742 B2 | 5/2006 | Khavakh et al. | |
| 7,054,745 B1 | 5/2006 | Couckuyt et al. | |
| 7,065,448 B1 | 6/2006 | Gearhart | |
| 7,119,819 B1 | 10/2006 | Robertson et al. | |
| 7,148,908 B2 | 12/2006 | Riek et al. | |
| 7,149,625 B2 | 12/2006 | Mathews et al. | |
| 7,158,876 B2 | 1/2007 | Crook | |
| 7,194,356 B2 | 3/2007 | Sano | |
| 7,242,966 B1 | 7/2007 | Averkamp | |
| 7,373,244 B2 | 5/2008 | Kreft | |
| 7,379,811 B2 | 5/2008 | Rasmussen et al. | |
| 7,392,133 B2 | 6/2008 | Maruyama et al. | |
| 7,413,211 B2 | 8/2008 | Hendry et al. | |
| 7,433,780 B2 | 10/2008 | Machino | |
| 7,437,279 B2 | 10/2008 | Agrawala et al. | |
| 7,440,875 B2 | 10/2008 | Cuthbert et al. | |
| 7,460,565 B2 | 12/2008 | Dally et al. | |
| 7,460,953 B2 | 12/2008 | Herbst et al. | |
| 7,467,356 B2 | 12/2008 | Gettman et al. | |
| 7,480,565 B2 | 1/2009 | Ikeuchi et al. | |
| 7,539,606 B2 | 5/2009 | Comair et al. | |
| 7,542,882 B2 | 6/2009 | Agrawala et al. | |
| 7,551,172 B2 | 6/2009 | Yaron et al. | |
| 7,561,169 B2 | 7/2009 | Carroll | |
| 7,589,732 B2 | 9/2009 | Burtnyk et al. | |
| 7,620,494 B1 | 11/2009 | Matthews et al. | |
| 7,623,965 B2 | 11/2009 | Green | |
| 7,692,658 B2 | 4/2010 | Moore | |
| 7,697,027 B2 | 4/2010 | McMahon et al. | |
| 7,698,063 B2 | 4/2010 | Kim | |
| 7,701,434 B2 | 4/2010 | Kreek et al. | |
| 7,702,456 B2 | 4/2010 | Singh | |
| 7,706,973 B2 | 4/2010 | McBride et al. | |
| 7,729,854 B2 | 6/2010 | Muramatsu | |
| 7,734,415 B2 | 6/2010 | Oumi et al. | |
| 7,743,337 B1 | 6/2010 | Maeda et al. | |
| 7,746,343 B1 | 6/2010 | Charaniya et al. | |
| 7,761,227 B2 | 7/2010 | Kropp | |
| 7,830,243 B2 | 11/2010 | Buckley et al. | |
| 7,831,433 B1 | 11/2010 | Belvin et al. | |
| 7,831,917 B1 | 11/2010 | Karam | |
| 7,860,645 B2 * | 12/2010 | Kim | G01C 21/36 340/989 |
| 7,865,306 B2 | 1/2011 | Mays | |
| 7,917,285 B2 | 3/2011 | Rothschild | |
| 7,917,288 B2 | 3/2011 | Cheung et al. | |
| 7,925,427 B2 | 4/2011 | Zehler | |
| 7,933,395 B1 | 4/2011 | Bailly et al. | |
| 7,945,546 B2 | 5/2011 | Bliss et al. | |
| 7,949,546 B1 | 5/2011 | Klieman et al. | |
| 7,957,871 B1 | 6/2011 | Echeruo | |
| 8,010,407 B1 | 8/2011 | Santoro et al. | |
| 8,031,164 B2 | 10/2011 | Herz et al. | |

(56) References Cited

U.S. PATENT DOCUMENTS

| | | | |
|---|---|---|---|
| 8,041,503 B2 | 10/2011 | Choi et al. | |
| 8,102,253 B1 | 1/2012 | Brady, Jr. | |
| 8,103,440 B2 | 1/2012 | Sengoku et al. | |
| 8,111,258 B2 | 2/2012 | Ajioka et al. | |
| 8,115,764 B2 | 2/2012 | Kameda et al. | |
| 8,151,210 B2 | 4/2012 | Nezu et al. | |
| 8,190,326 B2 | 5/2012 | Nezu et al. | |
| 8,195,383 B2 | 6/2012 | Wipplinger et al. | |
| 8,200,847 B2 | 6/2012 | Lebeau et al. | |
| 8,214,142 B2 | 7/2012 | Cerecke et al. | |
| 8,237,713 B2 | 8/2012 | Yaron et al. | |
| 8,237,745 B1 * | 8/2012 | Cornell | G01C 21/3673 345/660 |
| 8,249,259 B2 | 8/2012 | Marumoto et al. | |
| 8,274,524 B1 | 9/2012 | Cornell et al. | |
| 8,301,371 B2 | 10/2012 | Sheha et al. | |
| 8,301,378 B2 | 10/2012 | Nishibashi et al. | |
| 8,306,730 B2 | 11/2012 | Nishibashi et al. | |
| 8,321,126 B2 | 11/2012 | Mays | |
| 8,326,444 B1 | 12/2012 | Classen et al. | |
| 8,335,642 B2 | 12/2012 | Wipplinger et al. | |
| 8,335,675 B1 | 12/2012 | Diverdi et al. | |
| 8,339,403 B2 | 12/2012 | Zhao et al. | |
| 8,339,990 B1 | 12/2012 | Tzamaloukas | |
| 8,355,862 B2 | 1/2013 | Matas et al. | |
| 8,359,389 B1 | 1/2013 | Cohen et al. | |
| 8,364,398 B2 | 1/2013 | Rossio et al. | |
| 8,370,060 B2 | 2/2013 | Rossio et al. | |
| 8,375,325 B2 | 2/2013 | Wuttke | |
| 8,411,087 B2 | 4/2013 | Wei et al. | |
| 8,428,871 B1 | 4/2013 | Matthews et al. | |
| 8,438,481 B2 | 5/2013 | Lau et al. | |
| 8,463,289 B2 | 6/2013 | Shklarski et al. | |
| 8,464,182 B2 | 6/2013 | Blumenberg et al. | |
| 8,489,641 B1 | 7/2013 | Seefeld et al. | |
| 8,498,812 B2 | 7/2013 | Ren et al. | |
| 8,515,667 B2 | 8/2013 | Haatainen | |
| 8,515,766 B1 | 8/2013 | Bringert et al. | |
| 8,583,373 B2 | 11/2013 | Hicks | |
| 8,589,069 B1 | 11/2013 | Lehman | |
| 8,589,075 B1 | 11/2013 | Jones | |
| 8,595,014 B2 | 11/2013 | Rychlik | |
| 8,600,654 B2 | 12/2013 | Kishikawa et al. | |
| 8,606,514 B2 | 12/2013 | Rowley et al. | |
| 8,606,516 B2 | 12/2013 | Vertelney et al. | |
| 8,607,167 B2 | 12/2013 | Matas et al. | |
| 8,612,151 B2 | 12/2013 | Winkler et al. | |
| 8,635,019 B2 | 1/2014 | Tertoolen | |
| 8,639,654 B2 | 1/2014 | Vervaet et al. | |
| 8,645,056 B2 | 2/2014 | Wipplinger et al. | |
| 8,645,366 B1 | 2/2014 | Acharya | |
| 8,665,112 B2 | 3/2014 | Chen et al. | |
| 8,665,278 B2 | 3/2014 | Zhao et al. | |
| 8,667,562 B2 | 3/2014 | Lebeau et al. | |
| 8,676,466 B2 | 3/2014 | Mudalige | |
| 8,681,176 B1 | 3/2014 | Maurer et al. | |
| 8,694,242 B2 | 4/2014 | Nagase | |
| 8,705,892 B2 | 4/2014 | Aguilera et al. | |
| 8,738,284 B1 * | 5/2014 | Jones | G01C 21/3673 701/409 |
| 8,739,070 B2 | 5/2014 | Mullen | |
| 8,762,048 B2 | 6/2014 | Kosseifi et al. | |
| 8,774,470 B1 | 7/2014 | Schmidt et al. | |
| 8,798,918 B2 | 8/2014 | Onishi et al. | |
| 8,818,618 B2 | 8/2014 | Follmer et al. | |
| 8,825,403 B1 | 9/2014 | Kadous et al. | |
| 8,849,564 B2 | 9/2014 | Mutoh | |
| 8,880,345 B2 | 11/2014 | Kazama et al. | |
| 8,880,568 B2 | 11/2014 | Perczynski et al. | |
| 8,890,863 B1 | 11/2014 | Lininger | |
| 8,933,960 B2 | 1/2015 | Lindahl et al. | |
| 8,963,702 B2 | 2/2015 | Follmer et al. | |
| 8,970,592 B1 | 3/2015 | Petterson | |
| 8,983,778 B2 | 3/2015 | McCarthy | |
| 9,043,150 B2 | 5/2015 | Forstall et al. | |
| 9,052,197 B2 | 6/2015 | Van et al. | |
| 9,147,286 B2 | 9/2015 | Piemonte et al. | |
| 9,159,153 B2 | 10/2015 | Chen et al. | |
| 9,212,918 B1 | 12/2015 | Newlin et al. | |
| 9,230,556 B2 | 1/2016 | Van et al. | |
| 9,243,924 B2 | 1/2016 | Van et al. | |
| 9,250,092 B2 | 2/2016 | Blumenberg et al. | |
| 9,266,536 B2 | 2/2016 | Loria et al. | |
| 9,304,008 B2 | 4/2016 | Poppen et al. | |
| 9,367,959 B2 | 6/2016 | Forstall et al. | |
| 9,418,672 B2 | 8/2016 | Pylappan et al. | |
| 9,465,890 B1 | 10/2016 | Wilson | |
| 9,466,127 B2 | 10/2016 | Lindahl et al. | |
| 9,588,987 B2 | 3/2017 | Wailes et al. | |
| 9,741,149 B2 | 8/2017 | Myung et al. | |
| 2001/0028350 A1 | 10/2001 | Matsuoka et al. | |
| 2001/0056325 A1 | 12/2001 | Pu et al. | |
| 2002/0010655 A1 | 1/2002 | Kjallstrom | |
| 2002/0059296 A1 | 5/2002 | Hayashi et al. | |
| 2002/0103599 A1 | 8/2002 | Sugiyama et al. | |
| 2002/0156556 A1 | 10/2002 | Ruffner | |
| 2002/0156572 A1 | 10/2002 | Bullock et al. | |
| 2002/0164998 A1 | 11/2002 | Younis | |
| 2003/0016850 A1 | 1/2003 | Kaufman et al. | |
| 2003/0023350 A1 | 1/2003 | Tan et al. | |
| 2003/0040864 A1 | 2/2003 | Stein | |
| 2003/0083851 A1 | 5/2003 | Nagamune | |
| 2003/0109266 A1 | 6/2003 | Rafiah et al. | |
| 2003/0137515 A1 | 7/2003 | Cederwall et al. | |
| 2003/0154079 A1 | 8/2003 | Ota et al. | |
| 2003/0182183 A1 | 9/2003 | Pribe | |
| 2003/0231190 A1 | 12/2003 | Jawerth et al. | |
| 2004/0001114 A1 | 1/2004 | Fuchs et al. | |
| 2004/0024524 A1 | 2/2004 | Miyazawa | |
| 2004/0046600 A1 | 3/2004 | Fujimoto et al. | |
| 2004/0048600 A1 | 3/2004 | Madour et al. | |
| 2004/0048620 A1 | 3/2004 | Nakahara et al. | |
| 2004/0070602 A1 | 4/2004 | Kobuya et al. | |
| 2004/0128066 A1 | 7/2004 | Kudo et al. | |
| 2004/0158395 A1 | 8/2004 | Yamada et al. | |
| 2004/0172418 A1 | 9/2004 | Dorum et al. | |
| 2004/0176908 A1 | 9/2004 | Senda et al. | |
| 2004/0204840 A1 | 10/2004 | Hashima et al. | |
| 2004/0212627 A1 | 10/2004 | Sumizawa et al. | |
| 2004/0212827 A1 | 10/2004 | Otsuji et al. | |
| 2004/0215389 A1 | 10/2004 | Hirose | |
| 2004/0236498 A1 | 11/2004 | Le et al. | |
| 2004/0236507 A1 | 11/2004 | Maruyama et al. | |
| 2004/0257363 A1 | 12/2004 | Veach | |
| 2005/0027705 A1 | 2/2005 | Sadri et al. | |
| 2005/0049786 A1 | 3/2005 | Odachi et al. | |
| 2005/0055159 A1 | 3/2005 | Song et al. | |
| 2005/0107993 A1 | 5/2005 | Cuthbert et al. | |
| 2005/0125148 A1 | 6/2005 | Van et al. | |
| 2005/0131631 A1 | 6/2005 | Nakano et al. | |
| 2005/0137791 A1 * | 6/2005 | Agrawala | G01C 21/367 701/454 |
| 2005/0143914 A1 | 6/2005 | Yamada et al. | |
| 2005/0149261 A9 | 7/2005 | Lee et al. | |
| 2005/0159945 A1 | 7/2005 | Otsuka et al. | |
| 2005/0177305 A1 | 8/2005 | Han | |
| 2005/0222760 A1 | 10/2005 | Cabral et al. | |
| 2005/0228553 A1 | 10/2005 | Tryon | |
| 2005/0243104 A1 | 11/2005 | Kinghorn | |
| 2005/0251331 A1 | 11/2005 | Kreft | |
| 2005/0273251 A1 | 12/2005 | Nix et al. | |
| 2005/0273252 A1 | 12/2005 | Nix et al. | |
| 2006/0015246 A1 | 1/2006 | Hui | |
| 2006/0015249 A1 | 1/2006 | Gieseke | |
| 2006/0025923 A1 | 2/2006 | Dotan et al. | |
| 2006/0026521 A1 | 2/2006 | Hotelling et al. | |
| 2006/0031786 A1 | 2/2006 | Hillis et al. | |
| 2006/0041372 A1 | 2/2006 | Kubota et al. | |
| 2006/0041379 A1 | 2/2006 | Brulle-Drews | |
| 2006/0058849 A1 | 3/2006 | Chen et al. | |
| 2006/0058949 A1 | 3/2006 | Fogel et al. | |
| 2006/0074553 A1 | 4/2006 | Foo et al. | |
| 2006/0122872 A1 | 6/2006 | Stevens et al. | |
| 2006/0135259 A1 | 6/2006 | Nancke-Krogh et al. | |

(56) References Cited

U.S. PATENT DOCUMENTS

| | | |
|---|---|---|
| 2006/0161440 A1 | 7/2006 | Nakayama et al. |
| 2006/0184323 A1 | 8/2006 | Park |
| 2006/0195255 A1 | 8/2006 | Kim |
| 2006/0195257 A1* | 8/2006 | Nakamura ......... G01C 21/3632 701/437 |
| 2006/0195259 A1 | 8/2006 | Pinkus et al. |
| 2006/0217879 A1 | 9/2006 | Ikeuchi et al. |
| 2006/0224316 A1 | 10/2006 | Ishida et al. |
| 2006/0247845 A1 | 11/2006 | Cera et al. |
| 2006/0270025 A1 | 11/2006 | Zarur et al. |
| 2006/0284879 A1 | 12/2006 | Nagata et al. |
| 2006/0285743 A1 | 12/2006 | Oh et al. |
| 2006/0287818 A1 | 12/2006 | Okude et al. |
| 2007/0032912 A1 | 2/2007 | Jung et al. |
| 2007/0061071 A1 | 3/2007 | Torii |
| 2007/0076137 A1 | 4/2007 | Chiang |
| 2007/0080830 A1 | 4/2007 | Sacks |
| 2007/0088502 A1 | 4/2007 | Oumi et al. |
| 2007/0088897 A1 | 4/2007 | Wailes et al. |
| 2007/0140187 A1 | 6/2007 | Rokusek et al. |
| 2007/0150179 A1 | 6/2007 | Pinkus et al. |
| 2007/0150842 A1 | 6/2007 | Chaudhri et al. |
| 2007/0174006 A1 | 7/2007 | Kusumoto |
| 2007/0185650 A1 | 8/2007 | Yokota et al. |
| 2007/0192020 A1 | 8/2007 | Brulle-Drews et al. |
| 2007/0195089 A1 | 8/2007 | Furukado |
| 2007/0200674 A1 | 8/2007 | Moore et al. |
| 2007/0208502 A1 | 9/2007 | Sakamoto et al. |
| 2007/0208719 A1 | 9/2007 | Tran |
| 2007/0213092 A1 | 9/2007 | Geelen |
| 2007/0219706 A1 | 9/2007 | Sheynblat |
| 2007/0219718 A1 | 9/2007 | Pennock et al. |
| 2007/0233371 A1 | 10/2007 | Stoschek et al. |
| 2007/0245245 A1 | 10/2007 | Blue et al. |
| 2007/0265772 A1 | 11/2007 | Geelen |
| 2007/0273712 A1 | 11/2007 | O'Mullan et al. |
| 2007/0276596 A1 | 11/2007 | Solomon et al. |
| 2007/0276597 A1 | 11/2007 | Kato et al. |
| 2007/0293958 A1 | 12/2007 | Stehle et al. |
| 2008/0016145 A1 | 1/2008 | Takase et al. |
| 2008/0032663 A1 | 2/2008 | Doyle |
| 2008/0040024 A1 | 2/2008 | Silva |
| 2008/0059061 A1 | 3/2008 | Lee |
| 2008/0059889 A1 | 3/2008 | Parker et al. |
| 2008/0062126 A1 | 3/2008 | Algreatly |
| 2008/0062173 A1 | 3/2008 | Tashiro |
| 2008/0068221 A1 | 3/2008 | Park |
| 2008/0068223 A1 | 3/2008 | Behr et al. |
| 2008/0077324 A1 | 3/2008 | Hatano et al. |
| 2008/0082225 A1 | 4/2008 | Barrett |
| 2008/0086356 A1 | 4/2008 | Glassman et al. |
| 2008/0091344 A1 | 4/2008 | Mikuriya et al. |
| 2008/0109404 A1 | 5/2008 | Holm |
| 2008/0114541 A1 | 5/2008 | Shintani et al. |
| 2008/0122796 A1 | 5/2008 | Jobs et al. |
| 2008/0133124 A1 | 6/2008 | Sarkeshik |
| 2008/0140314 A1 | 6/2008 | Park |
| 2008/0154489 A1 | 6/2008 | Kaneda et al. |
| 2008/0167798 A1 | 7/2008 | Tertoolen |
| 2008/0167801 A1 | 7/2008 | Geelen et al. |
| 2008/0168396 A1 | 7/2008 | Matas et al. |
| 2008/0168398 A1 | 7/2008 | Geelen et al. |
| 2008/0171559 A1 | 7/2008 | Frank et al. |
| 2008/0174570 A1 | 7/2008 | Jobs et al. |
| 2008/0195307 A1 | 8/2008 | Raynaud et al. |
| 2008/0195638 A1 | 8/2008 | Winberry et al. |
| 2008/0198158 A1 | 8/2008 | Iwamura et al. |
| 2008/0204462 A1 | 8/2008 | Reed et al. |
| 2008/0208450 A1* | 8/2008 | Katzer ............... G01C 21/3635 701/533 |
| 2008/0215234 A1 | 9/2008 | Geelen |
| 2008/0228393 A1* | 9/2008 | Geelen ............... G01C 21/3638 701/532 |
| 2008/0238941 A1 | 10/2008 | Kinnan et al. |
| 2008/0270025 A1 | 10/2008 | Wlotzka |
| 2008/0288884 A1 | 11/2008 | Daughtrey |
| 2008/0320419 A1 | 12/2008 | Matas et al. |
| 2009/0005981 A1 | 1/2009 | Forstall et al. |
| 2009/0012708 A1 | 1/2009 | Wu et al. |
| 2009/0018764 A1 | 1/2009 | Ishibashi et al. |
| 2009/0028440 A1 | 1/2009 | Elangovan et al. |
| 2009/0037094 A1 | 2/2009 | Schmidt |
| 2009/0040240 A1 | 2/2009 | Grotjohn et al. |
| 2009/0043491 A1 | 2/2009 | Haatainen |
| 2009/0063041 A1* | 3/2009 | Hirose ............... G01C 21/3632 701/533 |
| 2009/0063048 A1 | 3/2009 | Tsuji |
| 2009/0064014 A1 | 3/2009 | Nelson et al. |
| 2009/0074249 A1 | 3/2009 | Moed et al. |
| 2009/0082960 A1 | 3/2009 | Ramaswamy et al. |
| 2009/0093957 A1 | 4/2009 | Se et al. |
| 2009/0096753 A1 | 4/2009 | Lim |
| 2009/0100018 A1 | 4/2009 | Roberts |
| 2009/0105944 A1 | 4/2009 | Urano et al. |
| 2009/0119001 A1 | 5/2009 | Moussaeiff et al. |
| 2009/0143977 A1 | 6/2009 | Beletski et al. |
| 2009/0150373 A1 | 6/2009 | Davis et al. |
| 2009/0154666 A1 | 6/2009 | Rios et al. |
| 2009/0156234 A1 | 6/2009 | Sako et al. |
| 2009/0164115 A1 | 6/2009 | Kosakowski et al. |
| 2009/0171561 A1 | 7/2009 | Geelen |
| 2009/0171575 A1 | 7/2009 | Kim et al. |
| 2009/0171577 A1 | 7/2009 | Roumeliotis et al. |
| 2009/0171578 A1 | 7/2009 | Kim et al. |
| 2009/0171580 A1 | 7/2009 | Nezu |
| 2009/0177385 A1 | 7/2009 | Matas et al. |
| 2009/0181650 A1* | 7/2009 | Dicke ................. G01C 21/32 455/414.1 |
| 2009/0182497 A1 | 7/2009 | Hagiwara |
| 2009/0187335 A1* | 7/2009 | Muhlfelder ........ G01C 21/3635 701/532 |
| 2009/0198767 A1 | 8/2009 | Jakobson et al. |
| 2009/0207121 A1 | 8/2009 | Shih et al. |
| 2009/0216434 A1* | 8/2009 | Panganiban ......... G01C 21/367 701/532 |
| 2009/0216442 A1 | 8/2009 | Luert |
| 2009/0222199 A1 | 9/2009 | Nishiura |
| 2009/0228195 A1 | 9/2009 | Lutz et al. |
| 2009/0228841 A1 | 9/2009 | Hildreth |
| 2009/0237510 A1 | 9/2009 | Chen et al. |
| 2009/0244100 A1 | 10/2009 | Schwegler et al. |
| 2009/0248420 A1 | 10/2009 | Basir et al. |
| 2009/0254273 A1 | 10/2009 | Gill et al. |
| 2009/0262117 A1 | 10/2009 | Soulchin et al. |
| 2009/0267954 A1 | 10/2009 | Cupps et al. |
| 2009/0273601 A1 | 11/2009 | Kim |
| 2009/0284478 A1 | 11/2009 | De et al. |
| 2009/0287408 A1 | 11/2009 | Gerdes et al. |
| 2009/0305742 A1 | 12/2009 | Caballero et al. |
| 2009/0306891 A1 | 12/2009 | Jeon et al. |
| 2009/0312942 A1 | 12/2009 | Froeberg |
| 2009/0326803 A1 | 12/2009 | Neef et al. |
| 2009/0326810 A1 | 12/2009 | Callaghan et al. |
| 2009/0327947 A1 | 12/2009 | Schreiner et al. |
| 2010/0002007 A1 | 1/2010 | Rajagopalan |
| 2010/0004852 A1 | 1/2010 | Kawamura |
| 2010/0017110 A1 | 1/2010 | Sengoku et al. |
| 2010/0030578 A1 | 2/2010 | Siddique et al. |
| 2010/0045703 A1 | 2/2010 | Kornmann et al. |
| 2010/0045704 A1 | 2/2010 | Kim |
| 2010/0057358 A1 | 3/2010 | Winer et al. |
| 2010/0074538 A1 | 3/2010 | Mishra et al. |
| 2010/0100310 A1 | 4/2010 | Eich et al. |
| 2010/0100317 A1 | 4/2010 | Jones et al. |
| 2010/0104174 A1 | 4/2010 | Rohlf et al. |
| 2010/0110314 A1 | 5/2010 | Kusano |
| 2010/0115030 A1 | 5/2010 | Hong et al. |
| 2010/0118065 A1 | 5/2010 | Song et al. |
| 2010/0120471 A1 | 5/2010 | Uchikawa et al. |
| 2010/0123737 A1 | 5/2010 | Williamson et al. |
| 2010/0125386 A1 | 5/2010 | Ibrahim |
| 2010/0125410 A1 | 5/2010 | Hicks |
| 2010/0131189 A1 | 5/2010 | Geelen et al. |
| 2010/0134425 A1 | 6/2010 | Storrusten |

(56) References Cited

U.S. PATENT DOCUMENTS

| | | |
|---|---|---|
| 2010/0146436 A1 | 6/2010 | Jakobson et al. |
| 2010/0153010 A1* | 6/2010 | Huang .............. G01C 21/3461 |
| | | 701/414 |
| 2010/0185382 A1 | 7/2010 | Barker et al. |
| 2010/0190513 A1 | 7/2010 | Andreasson |
| 2010/0205060 A1 | 8/2010 | Athsani et al. |
| 2010/0207751 A1 | 8/2010 | Follmer et al. |
| 2010/0211199 A1 | 8/2010 | Naik et al. |
| 2010/0211632 A1 | 8/2010 | Saarinen |
| 2010/0225644 A1 | 9/2010 | Swope et al. |
| 2010/0232626 A1 | 9/2010 | Paquier et al. |
| 2010/0246889 A1 | 9/2010 | Nara et al. |
| 2010/0250536 A1 | 9/2010 | Broadbent |
| 2010/0253549 A1 | 10/2010 | Kim et al. |
| 2010/0256902 A1 | 10/2010 | Coch et al. |
| 2010/0266161 A1 | 10/2010 | Kmiecik et al. |
| 2010/0280853 A1 | 11/2010 | Petralia et al. |
| 2010/0287024 A1 | 11/2010 | Ward et al. |
| 2010/0306191 A1 | 12/2010 | Lebeau et al. |
| 2010/0306659 A1 | 12/2010 | Shahine et al. |
| 2010/0309149 A1 | 12/2010 | Blumenberg et al. |
| 2010/0312466 A1 | 12/2010 | Katzer et al. |
| 2010/0312468 A1 | 12/2010 | Withanawasam |
| 2010/0313146 A1 | 12/2010 | Nielsen et al. |
| 2010/0324816 A1 | 12/2010 | Highstrom et al. |
| 2010/0324817 A1 | 12/2010 | Hansen et al. |
| 2010/0325104 A1 | 12/2010 | Kawauchi |
| 2010/0325194 A1 | 12/2010 | Williamson et al. |
| 2010/0328100 A1 | 12/2010 | Fujiwara et al. |
| 2010/0328316 A1 | 12/2010 | Stroila et al. |
| 2010/0332468 A1 | 12/2010 | Cantrell |
| 2011/0004589 A1 | 1/2011 | Rischar et al. |
| 2011/0006190 A1 | 1/2011 | Alameh et al. |
| 2011/0007000 A1 | 1/2011 | Lim |
| 2011/0022393 A1 | 1/2011 | Waeller et al. |
| 2011/0054772 A1 | 3/2011 | Rossio et al. |
| 2011/0055065 A1 | 3/2011 | Brenner |
| 2011/0055187 A1 | 3/2011 | Cai et al. |
| 2011/0060523 A1 | 3/2011 | Baron |
| 2011/0077852 A1 | 3/2011 | Ragavan et al. |
| 2011/0081889 A1 | 4/2011 | Gao et al. |
| 2011/0083167 A1 | 4/2011 | Carpenter et al. |
| 2011/0098917 A1 | 4/2011 | Lebeau et al. |
| 2011/0098918 A1 | 4/2011 | Siliski et al. |
| 2011/0106439 A1 | 5/2011 | Huang et al. |
| 2011/0106534 A1 | 5/2011 | Lebeau et al. |
| 2011/0106595 A1 | 5/2011 | Vande Velde |
| 2011/0112750 A1 | 5/2011 | Lukassen |
| 2011/0112762 A1 | 5/2011 | Gruijters et al. |
| 2011/0118971 A1 | 5/2011 | Petzold et al. |
| 2011/0122126 A1 | 5/2011 | Han et al. |
| 2011/0130949 A1 | 6/2011 | Arrasvuori |
| 2011/0131376 A1 | 6/2011 | Fischer |
| 2011/0131500 A1 | 6/2011 | Ohazama |
| 2011/0137561 A1 | 6/2011 | Kankainen |
| 2011/0144904 A1 | 6/2011 | Pinkus et al. |
| 2011/0153186 A1 | 6/2011 | Jakobson |
| 2011/0159844 A1 | 6/2011 | Gillet et al. |
| 2011/0161843 A1 | 6/2011 | Bennett et al. |
| 2011/0163874 A1 | 7/2011 | Van Os |
| 2011/0164029 A1 | 7/2011 | King et al. |
| 2011/0167058 A1 | 7/2011 | Van Os |
| 2011/0173229 A1 | 7/2011 | Choudhury et al. |
| 2011/0193795 A1 | 8/2011 | Seidman et al. |
| 2011/0196610 A1 | 8/2011 | Waldman et al. |
| 2011/0202862 A1 | 8/2011 | Kramer et al. |
| 2011/0207446 A1 | 8/2011 | Iwuchukwu |
| 2011/0208421 A1 | 8/2011 | Sakashita |
| 2011/0218711 A1 | 9/2011 | Mathur et al. |
| 2011/0231086 A1 | 9/2011 | Montealegre et al. |
| 2011/0246203 A1 | 10/2011 | Byrne et al. |
| 2011/0249030 A1 | 10/2011 | Hirose et al. |
| 2011/0252364 A1 | 10/2011 | Anzures et al. |
| 2011/0264708 A1 | 10/2011 | Smartt |
| 2011/0270517 A1 | 11/2011 | Benedetti |
| 2011/0271230 A1 | 11/2011 | Harris et al. |
| 2011/0276264 A1 | 11/2011 | Plocher et al. |
| 2011/0282567 A1 | 11/2011 | Nortrup |
| 2011/0282759 A1 | 11/2011 | Levin et al. |
| 2011/0285717 A1 | 11/2011 | Schmidt et al. |
| 2011/0289506 A1 | 11/2011 | Trivi et al. |
| 2011/0291860 A1 | 12/2011 | Ozaki et al. |
| 2011/0291863 A1 | 12/2011 | Ozaki et al. |
| 2011/0301728 A1 | 12/2011 | Hamilton et al. |
| 2011/0302527 A1 | 12/2011 | Chen et al. |
| 2011/0313649 A1 | 12/2011 | Bales et al. |
| 2012/0016577 A1 | 1/2012 | Kim et al. |
| 2012/0016678 A1 | 1/2012 | Gruber et al. |
| 2012/0019513 A1 | 1/2012 | Fong et al. |
| 2012/0023097 A1 | 1/2012 | Lebeau et al. |
| 2012/0035924 A1 | 2/2012 | Jitkoff et al. |
| 2012/0036556 A1 | 2/2012 | Lebeau et al. |
| 2012/0041674 A1 | 2/2012 | Katzer |
| 2012/0044243 A1 | 2/2012 | Kim et al. |
| 2012/0047134 A1 | 2/2012 | Hansson et al. |
| 2012/0050489 A1 | 3/2012 | Gupta et al. |
| 2012/0059812 A1 | 3/2012 | Bliss et al. |
| 2012/0060121 A1 | 3/2012 | Goldberg et al. |
| 2012/0062602 A1 | 3/2012 | Vadhavana et al. |
| 2012/0062604 A1 | 3/2012 | Lobo et al. |
| 2012/0078870 A1 | 3/2012 | Bazaz |
| 2012/0081404 A1 | 4/2012 | MacLellan et al. |
| 2012/0084670 A1 | 4/2012 | Momchilov |
| 2012/0092325 A1 | 4/2012 | Katano |
| 2012/0092541 A1 | 4/2012 | Tuulos et al. |
| 2012/0096393 A1 | 4/2012 | Shim et al. |
| 2012/0099804 A1 | 4/2012 | Aguilera et al. |
| 2012/0109509 A1 | 5/2012 | Nesbitt et al. |
| 2012/0127170 A1 | 5/2012 | Varadhan |
| 2012/0130625 A1 | 5/2012 | Srivastava |
| 2012/0143504 A1 | 6/2012 | Kalai et al. |
| 2012/0150428 A1 | 6/2012 | Niem et al. |
| 2012/0158290 A1 | 6/2012 | Bharathan et al. |
| 2012/0159402 A1 | 6/2012 | Nurmi et al. |
| 2012/0162267 A1 | 6/2012 | Shimazu |
| 2012/0166281 A1 | 6/2012 | Sartipi |
| 2012/0197839 A1 | 8/2012 | Vervaet et al. |
| 2012/0198002 A1 | 8/2012 | Goulart et al. |
| 2012/0200604 A1 | 8/2012 | Imaeda et al. |
| 2012/0206367 A1 | 8/2012 | Griffin et al. |
| 2012/0206469 A1 | 8/2012 | Hulubei et al. |
| 2012/0209518 A1 | 8/2012 | Nowak et al. |
| 2012/0214457 A1 | 8/2012 | Iaccarino |
| 2012/0216139 A1 | 8/2012 | Ording et al. |
| 2012/0223845 A1 | 9/2012 | Schumann |
| 2012/0233480 A1 | 9/2012 | Tanaka |
| 2012/0245849 A1* | 9/2012 | Spindler .............. G01C 21/32 |
| | | 701/533 |
| 2012/0249343 A1 | 10/2012 | Thomas |
| 2012/0253659 A1 | 10/2012 | Pu et al. |
| 2012/0254804 A1 | 10/2012 | Sheha et al. |
| 2012/0259539 A1 | 10/2012 | Sumizawa |
| 2012/0259541 A1 | 10/2012 | Downey et al. |
| 2012/0262592 A1 | 10/2012 | Rabii |
| 2012/0265433 A1 | 10/2012 | Viola et al. |
| 2012/0284247 A1 | 11/2012 | Jiang et al. |
| 2012/0284297 A1 | 11/2012 | Aguera-Arcas et al. |
| 2012/0287114 A1 | 11/2012 | Hallock et al. |
| 2012/0290972 A1 | 11/2012 | Yook et al. |
| 2012/0303263 A1* | 11/2012 | Alam ................... G01C 21/32 |
| | | 701/410 |
| 2012/0303268 A1 | 11/2012 | Su et al. |
| 2012/0311438 A1 | 12/2012 | Cranfill et al. |
| 2012/0314040 A1 | 12/2012 | Kopf et al. |
| 2012/0316774 A1 | 12/2012 | Yariv et al. |
| 2012/0316780 A1 | 12/2012 | Huth |
| 2012/0316955 A1 | 12/2012 | Panguluri et al. |
| 2012/0322458 A1 | 12/2012 | Shklarski et al. |
| 2013/0006775 A1 | 1/2013 | Jordan et al. |
| 2013/0018867 A1 | 1/2013 | Regan et al. |
| 2013/0021382 A1 | 1/2013 | Morlock et al. |
| 2013/0030954 A1 | 1/2013 | Liu et al. |
| 2013/0035853 A1 | 2/2013 | Stout et al. |
| 2013/0046456 A1 | 2/2013 | Scofield et al. |

(56) References Cited

U.S. PATENT DOCUMENTS

| | | |
|---|---|---|
| 2013/0046967 A1 | 2/2013 | Fullerton et al. |
| 2013/0069987 A1 | 3/2013 | Choe |
| 2013/0076249 A1 | 3/2013 | Chuang et al. |
| 2013/0076784 A1 | 3/2013 | Maurer et al. |
| 2013/0078784 A1 | 3/2013 | Minamihaba et al. |
| 2013/0086028 A1 | 4/2013 | Hebert |
| 2013/0110633 A1 | 5/2013 | Waldman et al. |
| 2013/0162632 A1* | 6/2013 | Varga .................. G06T 19/006 345/419 |
| 2013/0169579 A1 | 7/2013 | Havnor |
| 2013/0173654 A1 | 7/2013 | Lerman et al. |
| 2013/0176334 A1 | 7/2013 | Boldyrev et al. |
| 2013/0176384 A1 | 7/2013 | Jones et al. |
| 2013/0191020 A1* | 7/2013 | Emani .................. G08G 1/096816 701/468 |
| 2013/0218450 A1 | 8/2013 | Miyamoto |
| 2013/0222378 A1 | 8/2013 | Koivusalo |
| 2013/0227473 A1 | 8/2013 | Corvo |
| 2013/0230804 A1 | 9/2013 | Sakakibara et al. |
| 2013/0230840 A1 | 9/2013 | Parkar |
| 2013/0253933 A1 | 9/2013 | Maruta |
| 2013/0261856 A1 | 10/2013 | Sharma et al. |
| 2013/0290400 A1 | 10/2013 | Zhou et al. |
| 2013/0297321 A1 | 11/2013 | Raux et al. |
| 2013/0304373 A1 | 11/2013 | Kuo et al. |
| 2013/0307875 A1 | 11/2013 | Anderson |
| 2013/0321400 A1 | 12/2013 | Van et al. |
| 2013/0321401 A1 | 12/2013 | Piemonte et al. |
| 2013/0321402 A1 | 12/2013 | Moore et al. |
| 2013/0322634 A1 | 12/2013 | Bennett et al. |
| 2013/0322665 A1 | 12/2013 | Bennett et al. |
| 2013/0322702 A1 | 12/2013 | Piemonte et al. |
| 2013/0324164 A1 | 12/2013 | Vulcano |
| 2013/0325319 A1 | 12/2013 | Moore et al. |
| 2013/0325339 A1 | 12/2013 | McCarthy |
| 2013/0325340 A1 | 12/2013 | Forstall et al. |
| 2013/0325341 A1 | 12/2013 | Van et al. |
| 2013/0325342 A1 | 12/2013 | Pylappan et al. |
| 2013/0325343 A1 | 12/2013 | Blumenberg et al. |
| 2013/0325481 A1 | 12/2013 | Van et al. |
| 2013/0326380 A1 | 12/2013 | Lai et al. |
| 2013/0326384 A1 | 12/2013 | Moore et al. |
| 2013/0326407 A1 | 12/2013 | Van et al. |
| 2013/0326425 A1 | 12/2013 | Forstall et al. |
| 2013/0326467 A1 | 12/2013 | Nair et al. |
| 2013/0328861 A1 | 12/2013 | Arikan et al. |
| 2013/0328862 A1 | 12/2013 | Piemonte |
| 2013/0328871 A1 | 12/2013 | Piemonte et al. |
| 2013/0328883 A1 | 12/2013 | Sethia |
| 2013/0328915 A1 | 12/2013 | Arikan et al. |
| 2013/0328916 A1 | 12/2013 | Arikan et al. |
| 2013/0328924 A1 | 12/2013 | Arikan et al. |
| 2013/0328937 A1 | 12/2013 | Pirwani et al. |
| 2013/0345959 A1 | 12/2013 | Van et al. |
| 2013/0345962 A1 | 12/2013 | Van et al. |
| 2013/0345975 A1 | 12/2013 | Vulcano et al. |
| 2013/0345980 A1 | 12/2013 | Van et al. |
| 2013/0345981 A1 | 12/2013 | Van et al. |
| 2014/0019036 A1 | 1/2014 | Lemay et al. |
| 2014/0025298 A1 | 1/2014 | Spindler et al. |
| 2014/0025973 A1 | 1/2014 | Schillings et al. |
| 2014/0057683 A1 | 2/2014 | Li |
| 2014/0071119 A1 | 3/2014 | Piemonte et al. |
| 2014/0071130 A1 | 3/2014 | Piemonte |
| 2014/0095066 A1 | 4/2014 | Bouillet et al. |
| 2014/0122911 A1 | 5/2014 | Gunn et al. |
| 2014/0123062 A1 | 5/2014 | Nguyen |
| 2014/0152670 A1 | 6/2014 | Miyamoto et al. |
| 2014/0156187 A1* | 6/2014 | Goddard .............. G01C 21/3673 701/533 |
| 2014/0221051 A1 | 8/2014 | Oguri |
| 2014/0358438 A1 | 12/2014 | Cerny et al. |
| 2015/0067008 A1 | 3/2015 | Kamath et al. |
| 2015/0142314 A1 | 5/2015 | Lemay et al. |
| 2015/0149080 A1 | 5/2015 | McCarthy |
| 2015/0161254 A1 | 6/2015 | Boswell |
| 2015/0300833 A1 | 10/2015 | Van et al. |
| 2015/0323342 A1 | 11/2015 | Forstall et al. |
| 2015/0353082 A1 | 12/2015 | Lee et al. |
| 2016/0028824 A1 | 1/2016 | Stenneth et al. |
| 2016/0055669 A1 | 2/2016 | Piemonte et al. |
| 2016/0084668 A1 | 3/2016 | Van et al. |
| 2016/0161254 A1 | 6/2016 | Nakajima et al. |
| 2016/0216127 A1 | 7/2016 | Van et al. |
| 2017/0038941 A1 | 2/2017 | Pylappan et al. |
| 2017/0052672 A1 | 2/2017 | Forstall et al. |

FOREIGN PATENT DOCUMENTS

| | | |
|---|---|---|
| CN | 1250300 A | 4/2000 |
| CN | 1382960 A | 12/2002 |
| CN | 1484205 A | 3/2004 |
| CN | 1854948 A | 11/2006 |
| CN | 1995917 A | 7/2007 |
| CN | 101097135 A | 1/2008 |
| CN | 101101217 A | 1/2008 |
| CN | 101257787 A | 9/2008 |
| CN | 101349569 A | 1/2009 |
| CN | 101408429 A | 4/2009 |
| CN | 101936740 A | 1/2011 |
| CN | 102211583 A | 10/2011 |
| CN | 102279710 A | 12/2011 |
| CN | 102388406 A | 3/2012 |
| CN | 202204518 U | 4/2012 |
| CN | 102840866 A | 12/2012 |
| CN | 102967304 A | 3/2013 |
| DE | 102007030226 A1 | 1/2009 |
| DE | 102008036748 A1 | 10/2009 |
| DE | 102008053547 A1 | 4/2010 |
| EP | 0461577 A2 | 12/1991 |
| EP | 0572129 A1 | 12/1993 |
| EP | 0822529 A1 | 2/1998 |
| EP | 1102037 A1 | 5/2001 |
| EP | 1626250 A1 | 2/2006 |
| EP | 1655677 A2 | 5/2006 |
| EP | 1788541 A1 | 5/2007 |
| EP | 1965172 A1 | 9/2008 |
| EP | 1995564 A1 | 11/2008 |
| EP | 2075542 A2 | 7/2009 |
| EP | 2075543 A2 | 7/2009 |
| EP | 2080985 A2 | 7/2009 |
| EP | 2194508 A1 | 6/2010 |
| EP | 2196892 A2 | 6/2010 |
| EP | 2213983 A2 | 8/2010 |
| EP | 2672223 A1 | 12/2013 |
| EP | 2672225 A2 | 12/2013 |
| EP | 2672226 A2 | 12/2013 |
| EP | 2672227 A2 | 12/2013 |
| EP | 2672228 A1 | 12/2013 |
| EP | 2672230 A1 | 12/2013 |
| EP | 2672231 A2 | 12/2013 |
| JP | 09-292830 A | 11/1997 |
| JP | 11-038868 A | 2/1999 |
| JP | 2001-165670 A | 6/2001 |
| JP | 2002-243480 A | 8/2002 |
| JP | 2007-057857 A | 3/2007 |
| JP | 2008-008838 A | 1/2008 |
| JP | 2008-039731 A | 2/2008 |
| JP | 2008-158842 A | 7/2008 |
| JP | 2009-154647 A | 7/2009 |
| JP | 2009-204590 A | 9/2009 |
| TW | 200424964 A | 11/2004 |
| TW | 200731173 A | 8/2007 |
| TW | 201017110 A | 5/2010 |
| WO | 86/02764 A1 | 5/1986 |
| WO | 98/43192 A1 | 10/1998 |
| WO | 2005/103624 A2 | 11/2005 |
| WO | 2006/015892 A1 | 2/2006 |
| WO | 2007/056450 A2 | 5/2007 |
| WO | 2007/057857 A1 | 5/2007 |
| WO | 2007/101711 A2 | 9/2007 |
| WO | 2007/115221 A2 | 10/2007 |
| WO | 2008/056880 A1 | 5/2008 |
| WO | 2009/069165 A2 | 6/2009 |

(56) References Cited

FOREIGN PATENT DOCUMENTS

| | | |
|---|---|---|
| WO | 2009/115070 A1 | 9/2009 |
| WO | 2009/117820 A1 | 10/2009 |
| WO | 2011/025555 A1 | 3/2011 |
| WO | 2011/045861 A1 | 4/2011 |
| WO | 2011/059781 A1 | 5/2011 |
| WO | 2011/076989 A1 | 6/2011 |
| WO | 2011/084156 A2 | 7/2011 |
| WO | 2011/095602 A2 | 8/2011 |
| WO | 2011/124273 A1 | 10/2011 |
| WO | 2011/141980 A1 | 11/2011 |
| WO | 2011/146141 A1 | 11/2011 |
| WO | 2011/149231 A2 | 12/2011 |
| WO | 2011/151501 A1 | 12/2011 |
| WO | 2012/007745 A2 | 1/2012 |
| WO | 2012/034581 A1 | 3/2012 |
| WO | 2013/018448 A1 | 2/2013 |
| WO | 2013/184348 A2 | 12/2013 |
| WO | 2013/184391 A1 | 12/2013 |
| WO | 2013/184444 A2 | 12/2013 |
| WO | 2013/184445 A2 | 12/2013 |
| WO | 2013/184446 A2 | 12/2013 |
| WO | 2013/184447 A2 | 12/2013 |
| WO | 2013/184448 A2 | 12/2013 |
| WO | 2013/184449 A2 | 12/2013 |
| WO | 2013/184450 A2 | 12/2013 |
| WO | 2013/184472 A2 | 12/2013 |
| WO | 2013/184473 A2 | 12/2013 |
| WO | 2013/184533 A2 | 12/2013 |
| WO | 2013/184534 A2 | 12/2013 |

OTHER PUBLICATIONS

Meghan Kelly Google Maps rolls out business interiors in Street View Oct. 26, 2011 2 pages.
Kristi Hines 7 Creative Ways to Get Customer Testimonials, 2011 18 pages.
Himanshu Yadav 9 Awesome Google Maps Labs Features You SHould Know About Jun. 21, 2010 8 pages.
Greg Sterling New Google Maps Adds More Search Results to Info Window Dec. 3, 2013 6 pages.
"Topic 2: Map Projections and Coordinates Systems" http://hosting.soonet.ca/eliris/remotesensing/bl130lec2.html. Archived on Sep. 23, 2007. Retrieved on Apr. 20, 2015 from <https://web.archive.Org/web/20070923035156/http://hosting.soonet.ca/eliris/remotesensing/bl130lec2.html>.
"Today's Navigation Standard" http://www.casanovasadventures.com/catalog/gps/p3034.htm Archived on Jan. 6, 2005. Retrieved on May 28, 2015 from <http://web.archive.Org/web/20050106232808/http://www.casanovasadventures.com/catalog/gps/p3034.htm>.
"Google Earth API: Camera Control" https://developers.google.com/earth/documentation/camera_control. Archived on Mar. 26, 2012. Retrieved on May 30, 2015 from <https://web.archive.Org/web/20120326235132/https://developers.google.com/earth/documentation/camera_control>.
"Adaptive ArcGIS Server Tile Cache for Virtual Earth", published on Jan. 17, 2008, retrieved from http://blog.davebouwman.com/2008/01/17/adaptive-arcgis-server-tile-cache-for-virtual-earth/on Dec. 21, 2015.
Springer, Antti Nurminen & Antti Oulasvirta, Designing Interactions for Navigation in 3D Mobile Maps, pp. 198-224, Winter 2008, published in Map-based Mobile Services: Design, Interaction and Usability.
SkylineGlobe Web Package, version 6.1, 2012, pp. 1-23.
Plvhal, "Google Earth Intro & 3D Buildings", YouTube, Apr. 12, 2010, 1 page, retrieved on Aug. 9, 2013 from the Internet: https://www.youtube.com/watch?v=rGANAS0XMPA.
NATO Science and Technology Organization, Justin G. Hollands & Nada Ivanovic, Task Switching with 2D and 3D Displays of Geographic Terrain: The Role of Visual Momentum, p. 19-6, Sep. 10, 2002, published in RTO-MP-105.

Michael Siliski: "Fun on the Autobahn: Google Maps Navigation in 11 more Countries", Google Mobile Blog, Jun. 9, 2010 (Jun. 9, 2010).
Huhtala, J., Sarjanoja, A.H., Mantyjarvi, J., Isomursu, M. and Hakkila, J., 2009, August. Mobile screen transition animations. In SIGGRAPH'09: Posters (p. 25). ACM.
Google, Google Earth 3D Tour, https://www.youtube.com/watch?v=7Byxke1 Daqk; Jun. 26, 2009.
Gareth Beavis: "Google Earth finally coming to Android phones", Internet, Feb. 23, 2010 (Feb. 23, 2010).
YouTube video "Report a Problem with Google Maps" uploaded Oct. 27, 2009 https://www.youtube.com/watch?v=ByVdkytC8RE with screenshots 3 pages.
The Next Generation of Mobile Maps, http://googleblog.blogspot.com/2010/12/next-generation-of-mobile-maps.html. Archived on Dec. 23, 2010. Retrieved on Mar. 12, 2015 from <https://web.archive.Org/web/20101223203610/http://googleblog.blogspot.com/2010/12/next-generation-of-mobile-maps.html>.
Tauntingpanda, Ripple Effect Test in Unity 3d, https://www.youtube.com/watch?v=OaFfCJwnilM, May 18, 2009.
Tamar Weinberg "Move the Map Marker on Google Maps: A Screenshot Tour" Nov. 21, 2007 5 pages.
Software2Tech. Google Maps Voice Navigation in Singapore. 2011. [retrieved on Jan. 31, 2014]. Retrieved from the Internet: <URL: http://www.Youtube.com/watch?v=7B9JN7BkvME>. entire document.
Rickysmacintosh. iOS 5: Notifications Center and LockScreen. 2011 . [retrieved on Jan. 31, 2014]. Retrieved from the internet:<URL:http://www.youtube.com/watch?v=eurhcjpXHwo. Entire document.
Qureshi, Khurram, "Garmin Nuvi 885T Voice Recognition & Command Demonstration," Feb. 3, 2010, 1 page, available at http://www.youtube.com/watch?v=OOJKhTN6iMg.
Ponderevo, George, "Grayed out", Wikipedia, the free encyclopedia, Jun. 10, 2011, 2 pages.
PocketGPS. TomTom Go Live 1005 on the road Re-routing. Mar. 8, 2012. [retrieved on Jan. 31, 2014]. Retrieved from the Internet: <URL:http://www.youtube.com/watch?v=sJfNOcgoNA, entire document.
Partala, Timo, et al., "Speed-Dependent Camera Control in 3D Mobile Roadmaps," Intelligent Interactive Assistance and Mobile Multimedia Computing, Month Unknown, 2009, pp. 143-154, Springer Berlin Heidelberg.
Orbitz Staff, The 3-tap app: Orbitz launches free app for iPad users, Jul. 6, 2011.
Nurminen, Antti, et al., "10 Designing Interactions for Navigation in 3D Mobile Maps," Map-Based Mobile Services, Aug. 6, 2008, 31 pages, Springer, Berlin Heidelberg.
Magellan RoadMate Reference Manual Instructions for Operating the Magellan RoadMate 860T Copyright 2006 106 pages.
Magellan roadMate 9020 GPS Recevier 9055 User Manual copyright 2010 48 pages.
Magellan RoadMate 2010 North America Apllication User Manual Copyright 2009 24 pages.
Lawrence, Review: Sygic Mobile Maps 2009, Jul. 23, 2009, iPhonewzealand, retreived from http://www.iphonewzealand.co.nz/2009/all/review-sygic-mobile-maps-20091 on Feb 26, 2015.
Kevin Purdy, "ChompSMS Is a Handy Replacement for Androids SMS App," http://lifehacker.com/5596492/chompsms-is-a-handy-replacement-for-androids-sms-app, (posted Jul. 26, 2010, accessed Aug. 28, 2011).
Jiuxiang Hu et al.; "Road Network Extraction and Intersection Detection from Aerial Images by Tracking Road Footprints"; Dec. 2007; IEEE Transactions on Geoscience and Remote Sensing, pp. 4144-4157.
Jake Gaecke, Appletell reviews Sygic Mobile Maps 2009 North America for iPhone, Aug. 9, 2009, http://www.technologytell.com/apple/49215/appletell-reviews-sygic-mobile-maps-2009-north-america/.
IOS 4.2 user guide manufactured by Apple, Inc, released on Mar. 2011, 274 pages.
Harrower, Mark, "A Look at the History and Future of Animated Maps", Cartographica, Sep. 1, 2004, pp. 33-42, vol. 39, No. 3, University of Toronto Press, Canada.

(56) References Cited

OTHER PUBLICATIONS

Gus Class, "Custom Gestures for 3D Manipulation Using Windows," Feb. 23, 2011, retrived from http://www.codeproject.com/Articles/161464/Custom-Gestures-for-D-Manipulation-Using-Windows on Mar. 16, 2016.

Greg Sterling Google Now Enables Maps Users to "Report A Problem" Oct. 8, 2009 4 pages.

Google Earth Blog Use StreetView to make Points of Interest more precise Mar. 10, 2010 7 pages.

Feng Yuten and Haiyan Fan, "Research on Dynamic Water Surface and Rippie Animation," International Journal of Information Technology and Computer Science (IJITCS) 2,1 (2010): 18.

Dube, Ryan, "Use Google Maps Navigation for Turn-By-Turn GPS [Android]", available at http://www.makeuseof.com/tag/google-maps-navigation-turnbyturn-gps-androi- d/, Jun. 24, 2010, 7 pages.

Dal Poz, Aluir Porfirio, Rodrigo Bruno Zanin, and Giovane Maia do Vale. "Automated extraction of road network from medium- and high-resolution images." Pattern recognition and image analysis 16.2 (2006): 239-248.

Chris Runs. My Favorite Android Apps: Maps. 2011. [retrieved on Jan. 31, 2014]. Retrieved from the Internet<URL: http://www,youtube,com/watch?v=v2aRkLkT3s>. entire document.

Chitu. More Suggestions in Google Maps. Unofficial news and tips about Google. Blog. Apr. 21, 2010. Retrieved on [Dec. 1, 2013]. Retrieved from the Internet: URL http://googlesystem.blogspot.com/2010/04/more-SuggestionS"ingoogle-maps.html Entire document.

Chitu, Alex, "Google Operating System: Unofficial News and Tips about Google", Apr. 21, 2010, 2 pages, available at http://googlesystem.blogspot.com/2010/04/more-suggestions-in-google-maps.html.

Chen, Ching-Chien, et al., "Automatically Conflating Road Vector Data with Orthoimagery," GeoInformatica, Mar. 2006, pp. 495-530, Springer Science + Business Media, LLC.

Charalambos Poullis et al.; "Delineation and geometric modeling of road networks"; Nov. 2009; ISPRS Journal of Photogrammetry and Remote Sensing; p. 165-181.

Author Unknown, "Touch & Go Owner's Manual," Jul. 2011, 218 pages, Toyota, United Kingdom.

Author Unknown, "Resolve Road Conflicts (Cartography)," ARCGIS help 10.1, Nov. 11, 2011, 4 pages, Esri, available at http://help.arcgis.com/en/arcgisdesktop/10.0/help/index.html#//0070000000-19000000.htm.

Author Unknown, "NiLS Lockscreen Notifications," Apr. 6, 2015, 3 pages, available at https://play.google.com/store/apps/details?id=com.roymam.android.notificationswidget&hl=en.

Author Unknown, "Motorola XOOM: Google Maps," TechHarvest, Feb. 25, 2011, 1 page, available at http://www.youtube.com/watch?v=adkl5zMp7W4.

Author Unknown, "MAZDA: Navigation System—Owner's Manual", available at http://download.tomtom.com/open/manuals/mazda/nva-sd8110/Full_Manual_EN.pdf, Jan. 1, 2009, 159 pages.

Author Unknown, "Lux Auto Brightness," Dec. 26, 2014, 3 pages, available at https://play.google.com/store/apps/details?id=com.vito.lux&hl=en.

Author Unknown, "IOS 5: Notifications Center and LockScreen", Jun. 9, 2011, available at http:///www.youtube.com/watch?v=eurhcjpXHwo.

Author unknown, "Google Navigation 5.3 will not allow the phone to sleep," Dave Morg, 1 page, Apr. 11, 2011, available at https://productforums.google.com/forum/#!topic/maps/is54TSBVK2E.

Author Unknown, "Google Maps—Two Finger Rotate in Nexus One," androidapk, Apr. 9, 2011, 1 page, available at http://www.youtube.com/watch?v=f7VNoErYNt8.

Author Unknown, "Garmin. nuvi 1100/1200/1300/1400 series owner's manual," Jan. 2011, 72 pages, Garmin Corporation, No. 68, Jangshu 2nd Road, Sijhih, Taipei County, Taiwan.

Author Unknown, "chomSMS-Change Log," Jul. 16, 2010, 29 pages, available at http:/.chompsms.com/main/changelog.

Author Unknown, "Blaupunkt chooses NNG navigation software for new aftermarket product," May 24, 2011, 2 pages, available at http://telematicsnews.info/2011/05/24/blaupunkt-chooses-nng-navigation-software-for-new-aftermarket-product_my2241/.

Author Unknown, "3D Building Features on Google Maps Mobile App with 2 Fingers Tilt, Rotate, Zoom," adistarone, Jul. 21, 2011, 1 page, available at http://www.youtube.com/watch?v=lqkKK1Xt8W0.

Author Unknown, "(SC4) Sim City for Highways & Autobahns," Aug. 12, 2011, pp. 1-35, available at http://www.skyscrapercity.com/showthread.php?t=639496&page=14.

Android 2.3.4 User's Guide. Google. May 20, 2011. Retrieved on [Dec. 1, 2013]. Retrieved from the Internet: URL<http://static.google usercontent.com/media/www.google.com/en.us/help/hc/pdfs/mobile/AndroidUsersGuide-2.3.4.pdf> entire document.

Agrawal et al.; "Geometry-based Mapping and Rendering of Vector Data over LOD Phototextured 3D Terrain Models"; 2006; pp. 1-8.

Access Ana, "Accessible Android", http://accessibleandroid.blogspot.com/2010/09/how-do-i-set-or-change-default-home.html (posted Sep. 15, 2010, accessed Sep. 2014).

"Using Search in Google Maps", Jan. 6, 2011 (Jan. 6, 2011), XP054975742, Retrieved from the Internet: URL:https://www.youtube.com/watch?v=ihlddF T7r3g [retrieved on Feb. 13, 2015].

Author unknown, Maths—Angle between vectors, retrieved from https://web.archive.org/web/20061110112226/http://www.euclideanspace.com/maths/algebra/vectors/angleBetween/index.htm on Aug. 22, 2018, archived from http://www.euclideanspace.com/maths/algebra/vectors/angleBetween/index.htm on Nov. 10, 2006.

Haala N, Kada M. Panoramic scenes for texture mapping of 3D city models. International Archives of Photogrammetry and Remote Sensing. Feb. 2005;36(Part 5/W8).

GLOBAL, Touch surface screen with ripple effect at Lisbon's Oceanarium, Mar. 11, 2009, https://www.youtube.com/watch?v=O2b6VSKWPJM.

* cited by examiner

RENDERING ROAD SIGNS DURING NAVIGATION

CROSS-REFERENCE TO RELATED APPLICATION(S)

The present application is a continuation of U.S. patent application Ser. No. 14/611,157, filed Jan. 30, 2015, now published as U.S. Patent Publication 2015/0142314 which is a divisional application of U.S. patent application Ser. No. 13/632,029, filed Sep. 30, 2012, now patented as U.S. Pat. No. 9,482,296 which claims the benefit of U.S. Provisional Application 61/655,997, filed Jun. 5, 2012; U.S. Provisional Application 61/656,032, filed Jun. 6, 2012; U.S. Provisional Application 61/656,043, filed Jun. 6, 2012; U.S. Provisional Application 61/657,864, filed Jun. 10, 2012; U.S. Provisional Application 61/657,880, filed Jun. 10, 2012; U.S. Provisional Application 61/699,754, filed Sep. 11, 2012; U.S. Provisional Application 61/699,851, filed Sep. 11, 2012; and U.S. Provisional Application 61/699,855, filed Sep. 11, 2012, the disclosures of which are incorporated herein by reference in their entirety.

BACKGROUND

To date, many navigation devices have been sold to assist people to navigate a route between two locations. While such devices have proved to be very useful, their navigation presentations often are very stale and lack an elegant design that maximizes the data provided to the user during a presentation. As such, the presentations that these devices provide their users can, at times, lead to the users being confused and in some cases getting lost during the navigation presentations.

BRIEF SUMMARY

Some embodiments of the invention provide a navigation application that presents road signs during a navigation presentation. Such road signs provide some context for the navigation instructions, and help the user associate the instructions during navigation with the area that the user is navigating in the real world.

In some embodiments, the application differentiates the appearance of road signs at junctions that require a change of direction from road signs at junctions that do not require a change of direction. Also, in some embodiments, the application performs processes that ensure that it arranges the road signs on the map in an aesthetically pleasing manner. In addition, the navigation application of some embodiments does not display too many road signs along the navigated route so that the route is not by occluded by too many road signs.

To select the road signs for display, the navigation application in some embodiments categorizes the roads into multiple tiers. For instance, in some embodiments, the application categorizes all roads on the navigated route as tier 1, all roads that intersect or overlap with the navigated route as tier 2, all roads that intersect the tier 2 roads as tier 3, and all other roads as tier 4. The navigation application of other embodiments defines the road tiers differently. For example, the application in some embodiments categorizes roads that intersect the above mentioned tier 2 roads differently based on the distance of these roads to the navigated route, and/or based on the time it would take for the device to reach these roads from the navigated route. Accordingly, these embodiments categorize (1) all roads on the navigated route as tier 1, (2) all roads that intersect or overlap with the navigated route as tier 2, (3) roads that intersect the tier 2 roads as tier 3 when these roads are within a threshold distance of the navigated route and/or when these roads can be reached from the navigated route within a threshold time, (4) roads that intersect the tier 2 roads as tier 4 when these roads are not within a threshold distance of the navigated route and/or when these roads cannot be reached from the navigated route within a threshold time, and (5) all other roads as tier 5 roads. Still other embodiments use other mechanisms to categorize roads and/or have other number of tiers.

After categorizing the roads into several tiers, the application performs processes that ensure that it does not place too many road signs on or nearby the navigated route and that it places these road signs on the route in an aesthetically pleasing manner. Different embodiments perform these tasks differently. For instance, in some embodiments, the application uses a predetermined or user-defined maximum and minimum numbers of road signs that can appear in the device view at any given time. Based on these numbers and based on a preference for the lower tier roads, the application then identifies the roads for which it should show road signs. When there are too many tiers 1 and 2 road signs, the application in some embodiments gives a preference to road signs that are closer to the current location of the user and relate to the direction of travel of the user.

Several more detailed embodiments of the invention are provided below. Many of these examples refer to controls (e.g., selectable items) that are part of the navigation application. Also, in several of the examples below (such as those illustrated in FIGS. 1 and 3-12) the device on which the application executes has a touch screen through which a user can interact with the navigation application. However, one of ordinary skill in the art will realize that cursor controllers or other input devices can be used to interact with the controls and the application shown in these examples for other embodiments that execute on devices with cursors and cursor controllers or other input mechanisms (e.g., voice control).

The preceding Summary is intended to serve as a brief introduction to some embodiments as described herein. It is not meant to be an introduction or overview of all subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawing, but rather are to be defined by the appended claims, because the claimed subject matters can be embodied in other specific forms without departing from the spirit of the subject matters.

BRIEF DESCRIPTION OF THE DRAWINGS

The novel features of the invention are set forth in the appended claims. However, for purposes of explanation, several embodiments of the invention are set forth in the following figures.

DETAILED DESCRIPTION

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

Some embodiments of the invention provide a navigation application that presents road signs during a navigation presentation. Such road signs provide some context for the navigation instructions, and help the user associate the instructions during navigation with the area that the user is navigating in the real world.

Figure 1:
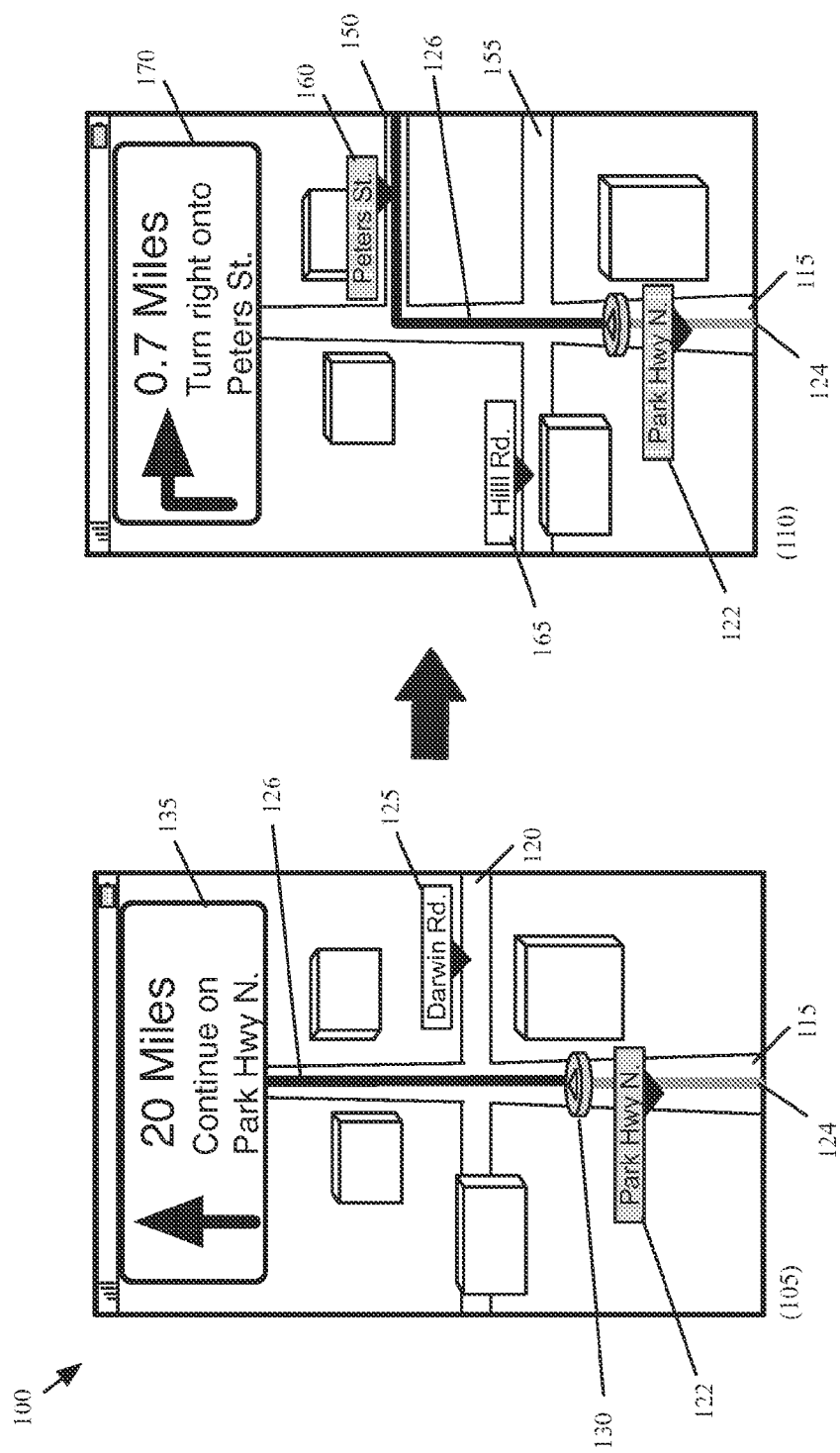
FIG. 1 illustrates an example of a navigation presentation with road signs for some embodiments of the invention.

FIG. 1 illustrates an example of a navigation presentation with such road signs for some embodiments of the invention. This figure illustrates the user interface (UI) 100 of a navigation application that is executing on a device to provide the navigation presentation. FIG. 1 illustrates the UI 100 during two stages 105 and 110 of operations that relate to two different portions of the navigation presentation that correlate to two different positions of the device along a navigated route. In both stages, the navigation presentation provides a three-dimensional (3D) perspective view of a portion of the navigated route.

The first stage 105 shows a first portion of the navigation presentation that displays two intersecting roads 115 and 120. The first road 115 is a road along the navigated route, as indicated by a graphical object 130 (which is a colored puck in this example), a first color line 124 that trails this object 130, a second color line 126 that leads this object, and a banner 135 that specifies the direction and remaining distance of travel along the first road. The second road 120 is a road that is not along the navigated route, but intersects the first road 115 along this route.

A road is "along" a navigate route when the device has to traverse along that road in the direction of travel along that road. Hence, the second road 120 is not a road along the navigated route because the puck 130 is never supposed to travel along this road in the direction of travel of this road. If the device has to re-specify the navigated route (e.g., in response to the user making an incorrect turn along the previous navigated route), a road that was not along the previously specified navigated route might end up along the newly specified navigate route.

The first stage 105 also shows two road signs 122 and 125 for these two roads 115 and 120. Both road signs are presented by the application as vertically standing objects in the 3D perspective navigation scene that the application is presenting. This vertical appearance is meant to simulate vertically standing road signs in the real world that the user passes along the navigated route. In some embodiments, the application augments the realistic look of such road signs by generating and displaying shadows for these road signs in the 3D scene, and/or by making the appearance of these road signs similar or identical to their appearance or expected appearance in the real world. Also, in some embodiments, the road signs are not made to look perfectly vertical in the 3D scene, but rather are made to look practically vertical, e.g., to be within a particular angle (e.g., 0 to 45 degrees) of such a vertical alignment.

The first stage 105 further shows that the application in some embodiments differentiates the appearance of road signs at junctions along the navigated route that require a change of direction from road signs at junctions along the route that do not require a change of direction. Specifically, in this example, the first and second road signs are presented in different colors because the first road sign 122 is for a road along the navigated route, while the second road sign 125 is for a road that intersects the navigated route but is not along the navigated route. While FIG. 1 and other figures in this document differentiate road signs for junctions along the navigated route from road signs at junctions not along the navigated route by using different colors for such roads, one of ordinary skill will realize that the navigation application of other embodiments use other techniques to differentiate the appearance of such road signs. Examples of such other techniques include making some or all road signs for junctions along the navigated route blink (e.g., blinking the road sign for the next maneuver junction), using different fonts for the road signs for junctions along the navigated route, using different styles of signs for the road signs for junctions along the navigated route, etc.

The second stage 110 shows a different portion of the navigation presentation. In this portion, two new roads 150 and 155 are intersecting the first road 115. The road 150 is a road along the navigated route, as indicated (1) by the road sign 160 having the same color as the road sign 122 for the first road 115 that the puck 130 is currently traversing, and (2) by the second color line 126 that leads this object through the road 150, and (3) by a banner 170 that specifies the right turn from the road 115 onto the road 150. The road 155 is a road that is not along the navigated route, but intersects the first road 115 along this route.

The second stage 110 also shows three road signs 122, 160 and 165 for these three roads 115, 150 and 155. As before, each of these road signs is presented by the application as vertically standing objects in the 3D perspective navigation scene that the application is presenting. However, while the first and second road signs 122 and 160 have the same color appearance, the third road sign 165 at this stage has a different color appearance to signify that it is a sign for a road that is not along the navigated route.

In addition to differentiating the appearance of road signs at junctions along the route from road signs at junctions not along the navigated route, the application of some embodiments performs operations to ensure that it arranges the road signs on the map in an aesthetically pleasing manner, and to ensure that it does not display too many road signs along the navigated route so as not to occlude the route with too many road signs. To ensure that it does not display too many road signs, the application in some embodiments performs a categorization operation that ranks the roads into tiers.

Figure 2:
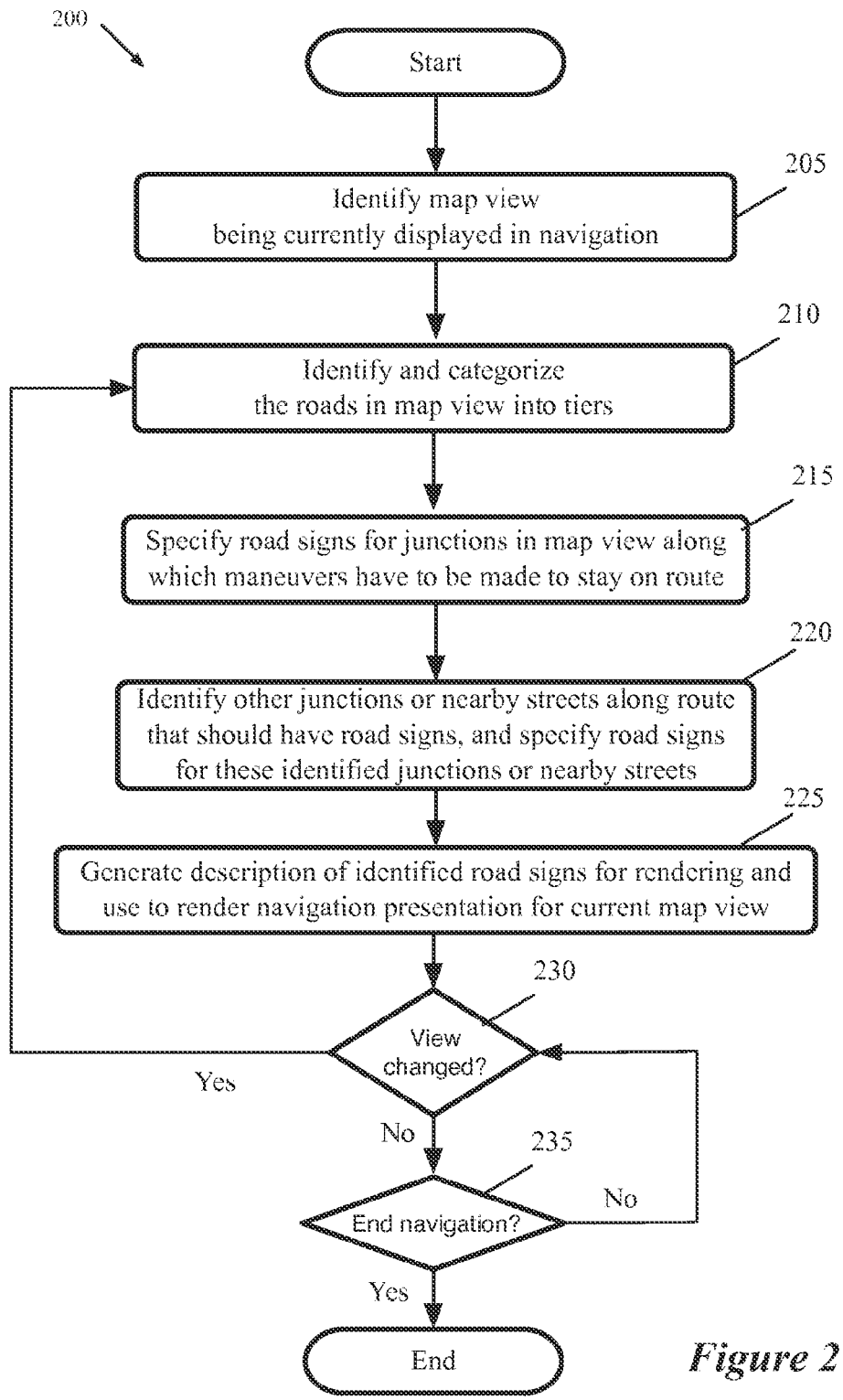
FIG. 2 presents a process that some embodiments use to present road signs.

FIG. 2 presents a process 200 that conceptually illustrates some of these operations. This process starts in some embodiments when the navigation application is directed to start a navigation presentation to provide navigation instructions to allow a user to navigate between two locations. As shown in FIG. 2, the process initially identifies (at 205) the map view that is to be displayed at the start of the navigation presentation. This view specifies a two or three dimensional scene that the process will have to render to generate the navigation presentation. In some embodiments, this scene will include roads, road signs, the graphical representation 130 of the device's current location, the trailing and leading road lines for indicating the direction of the past and future navigation, and a banner for providing navigation instructions. This scene also might include buildings and other constructs in the scene. In some embodiments, the process analyzes and renders a map view that is larger than the view that it can display on the screen at any given time in order to minimize latency for generation of surrounding areas as the user navigates to those areas.

After identifying the map view for generation, the process identifies (at 210) the roads in this map view and categorizes these roads into tiers. As mentioned below, the navigation application in some embodiments categorizes the roads into tiers in order to select the road signs for display. In some embodiments, the process categorizes all roads on the navigated route as tier 1, all roads that intersect or overlap with the navigated route as tier 2, all roads that intersect the tier 2 roads as tier 3, and all other roads as tier 4. The process 200 in other embodiments defines the road tiers differently. For example, the process in some embodiments categorizes roads that intersect the above mentioned tier 2 roads differently based on the distance of these roads to the navigated route, and/or based on the time it would take for the device to reach these roads from the navigated route. Accordingly, these embodiments categorize (1) all roads on the navigated route as tier 1, (2) all roads that intersect or overlap with the navigated route as tier 2, (3) roads that intersect the tier 2 roads as tier 3 when these roads are within a threshold distance of the navigated route and/or when these roads can be reached from the navigated route within a threshold time, (4) roads that intersect the tier 2 roads as tier 4 when these roads are not within a threshold distance of the navigated route and/or when these roads cannot be reached from the navigated route within a threshold time, and (5) all other roads as tier 5 roads. Still other embodiments use other mechanisms to categorize roads and/or have other number of tiers.

After categorizing the roads into several tiers, the process specifies (at 215) road signs along the navigation route for junctions where the user has to make a maneuver to stay on the navigation route. In some embodiments, the process might not specify road signs for all such junctions if there are more than a predetermined or user-specified number of such signs visible in the current map view, as too many such signs might occlude the map view too much. In such case, the process in some embodiments provides a preference for road signs for maneuver junctions that are closer to the current position of the user.

Next, at 220, the process identifies other junctions or nearby streets along the route that should have road signs based on the road tiers that it identified at 210. In some embodiments, the process performs this operation by ensuring that it does not place too many road signs on or nearby the navigated route. Different embodiments perform these tasks differently. For instance, in some embodiments, the process uses a predetermined or user-defined maximum and minimum numbers of road signs that can appear in the view at any given time. Based on these numbers and based on a preference for the lower tier roads, the application then identifies the roads and/or junctions for which it should show road signs. As mentioned above, the application in some embodiments gives a preference to road signs that are closer to the current location of the user and relate to the direction of travel of the user, when there are too many road signs of the same category and the process needs to use this category of road signs.

At 220, the process also specifies a road sign for each of the junctions and/or streets that it identifies at 220. The process in some embodiments differentiates the appearance of these road signs from the road signs along the route that it specified at 215. Also, in addition to differentiating signs for tier 1 roads from other tiered roads, the process in some embodiments differentiates the appearance of signs of other tiered roads from each other, e.g., differentiate signs for tier 2 roads form tier 3 roads. Other embodiments, however, do not do this because having more than two different types of road signs might be distracting in the navigation presentation.

At 220, the process further specifies a location for each road sign identified at 215 and 220, to display the road sign. In some embodiments, the process defines (at 220) places for these road signs along the route in order to enhance the aesthetic distribution and appearance of these road signs. The process performs this task of distributing the road signs differently in different embodiments. In some embodiments, the process starts from the direction of travel of the user along the navigation route, iterates through the succeeding identified road signs for display, and if possible places each road sign in each iteration on a different side of the navigated route, in order to distribute evenly the road signs about the navigated route as much as possible.

After 220, the process supplies (at 225) the road signs that it defined at 215 and 220 to one or more modules responsible for defining the description of these signs for rendering. This description is then used to render the navigation presentation for the current map view to include the road signs, other roads and other constructs in the map view.

Next, at 230, the process determines whether the navigation presentation should display a new view of the map. This is the case when the device is moving to a new location for which a new portion of the navigation presentation has to be generated. If the view has changed, the process returns to 210 to repeat operations 210-225 for this view. Otherwise, the process determines (at 235) whether the navigation has ended. If not, the process returns to 230. Otherwise, the process ends.

Many more examples of presenting road signs are described below. However, before describing these examples, an exemplary navigation application will now be described in section I. Section II then describes several example considerations that can factor into how the navigation application of some embodiments generates the road signs will now be described. Section III then describes an example process for labeling a navigation presentation. Section IV then describes electronic devices that employ the navigation application of some embodiments. Section V lastly describes location services used by some embodiments of the invention.

I. Navigation Application

Several more detailed examples of dynamically presenting road signs are described below. However, before describing these examples, an exemplary navigation application will now be described by reference to FIGS. 3-5.

A. User Interface

The navigation application of some embodiments is part of an integrated mapping application that includes several useful modalities, including location browsing, map searching, route identifying and route navigating operations. This integrated application (referred to below as the mapping application, the navigation application or the integrated application) in some embodiments identifies the location of the device using the coordinates in the GPS signal that the device receives at the location of the device. Alternatively or conjunctively, the mapping application uses other methods (e.g., cell tower triangulation) to compute the current location.

The mapping application of some embodiments is defined to be executed by a device that has a touch-sensitive screen that displays the output of the application. In some embodiments, this device has a multi-touch interface for allowing a user to provide touch and gestural inputs through the screen to interact with the application. Examples of such devices are smartphones (e.g., iPhone® sold by Apple Inc., phones operating the Android® operating system, phones operating the Windows 8® operating system, etc.).

Figure 3:
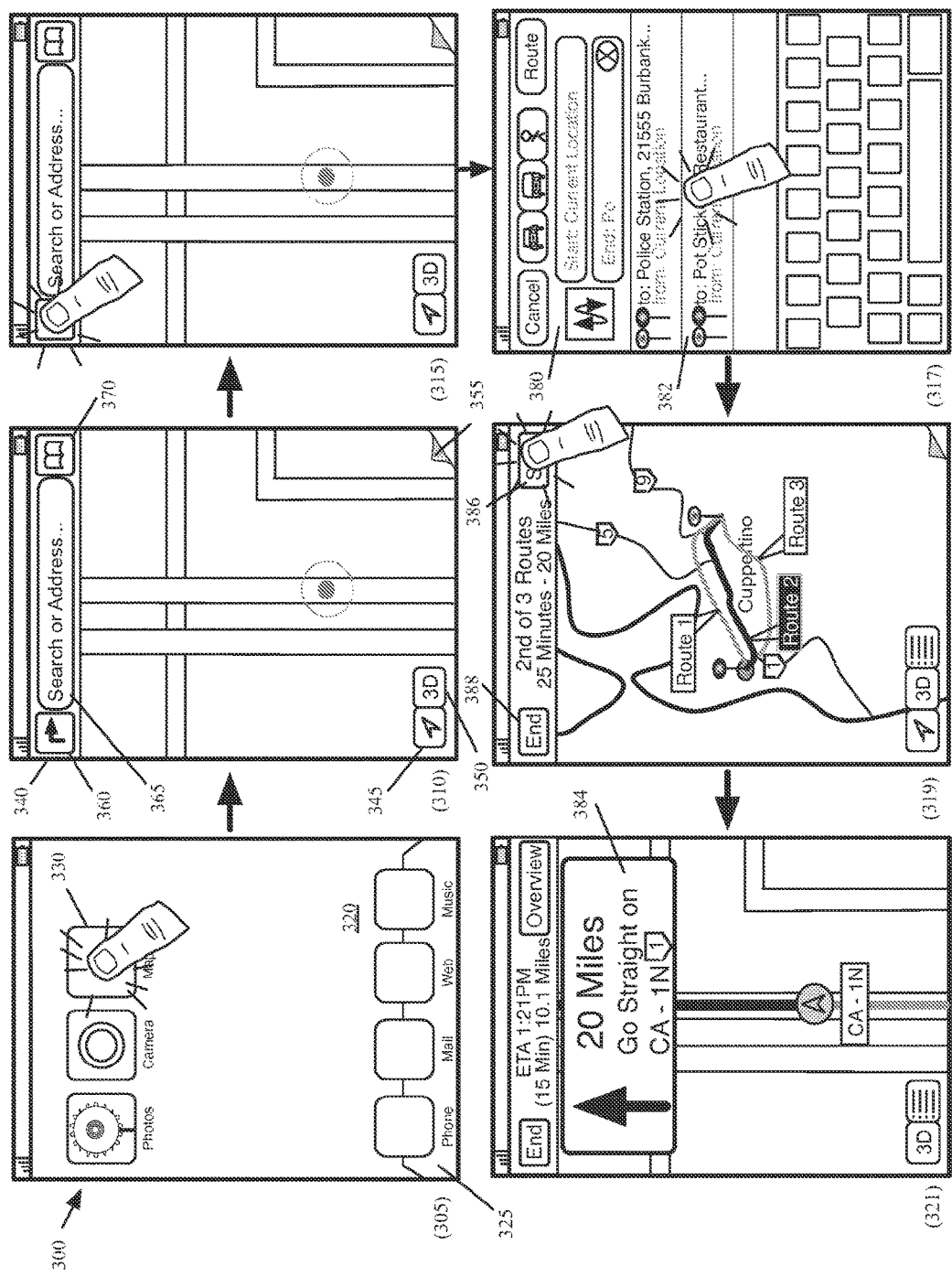
FIG. 3 illustrates an example of a device that executes an integrated mapping application of some embodiments of the invention.

FIG. 3 illustrates an example of a device 300 that executes an integrated mapping application of some embodiments of the invention. This figure also illustrates an example of launching a route navigation in this application. This application has a novel user interface (UI) design that seamlessly and cohesively integrates the controls for each of its different modalities by using a minimum set of on-screen controls that floats on top of the content in order to display as much of the content as possible. Additionally, this cluster adapts to the task at hand, adjusting its contents in an animated fashion when a user moves between the different modalities (e.g., between browsing, searching, routing and navigating). This common element with an adaptive nature enables the mapping application to optimize for different tasks while maintaining a consistent look and interaction model while moving between those tasks.

FIG. 3 shows six stages 305, 310, 315, 317, 319, 321 of interaction with the mapping application. The first stage 305 shows device's UI 320, which includes several icons of several applications in a dock area 325 and on a page of the UI. One of the icons on this page is the icon for the mapping application 330. The first stage shows a user's selection of the mapping application through touch contact with the device's screen at the location of this application on the screen.

The second stage 310 shows the device after the mapping application has opened. As shown in this stage, the mapping application's UI has a starting page that in some embodiments (1) displays a map of the current location of the device, and (2) several UI controls arranged in a top bar 340, and as floating controls. As shown in FIG. 3, the floating controls include an indicator 345, a 3D control 350, and a page curl control 355, while the top bar 340 includes a direction control 360, a search field 365, and a bookmark control 370.

In some embodiments, a user can initiate a search by tapping in the search field 365. This directs the application to present an animation that (1) presents an on-screen keyboard and (2) opens a search table full of invaluable completions. This table has some important subtleties. When the search field is tapped and before the terms are edited, or when the search field is empty, the table contains a list of "recents," which in some embodiments are recent searches and route directions that the user has requested. This makes it very easy to quickly bring up recently accessed results.

After any edit in the search field, the table is filled with search completions both from local sources (e.g., bookmarks, contacts, recent searches, recent route directions, etc.) and from remote servers. The incorporation of the user's contact card into the search interface adds additional flexibility to the design. When showing recents, a route from current location to the user's home is always offered in some embodiments, while it is offered in the contexts that are deemed to be "appropriate" in other embodiments. Also, when the search term is a prefix of an address label (e.g. 'Wo' for 'Work'), the application presents the user's labeled address as a completion in the search table in some embodiments. Together, these behaviors make the search UI a very powerful way to get results onto a map from a variety of sources. In addition to allowing a user to initiate a search, the presence of the text field in the primary map view in some embodiments also allows users to see the query corresponding to search results on the map and to remove those search results by clearing the query.

The bookmark control 370 (e.g., button) allows locations and routes to be bookmarked by the application. The position indicator 345 allows the current position of the device to be specifically noted on the map. Once this indicator is selected once, the application maintains the current position of the device in the center of the map. In some embodiments, it can also identify the direction to which the device currently points.

The 3D control 350 is a control for viewing a map or inspecting a route in three dimensions (3D). The mapping application provides the 3D control as a quick mechanism of getting into and out of 3D. This control also serves as (1) an indicator that the current view is a 3D view, and (2) an indicator that a 3D perspective is available for a given map view (e.g., a map view that is zoomed out might not have a 3D view available).

The page curl control 355 is a control that allows the application to minimize the number of on-screen controls, by placing certain less frequently used actions in a secondary UI screen that is accessible through the "page curl" control that is displayed on the map. In some embodiments, the page curl is permanently displayed on at least some of the map views that the application provides. For instance, in some embodiments, the application displays the page curl permanently on the starting page (illustrated in second stage 310) that it provides for allowing a user to browse or search a location or to identify a route.

The direction control 360 opens a direction entry page 380 through which a user can request a route to be identified between a starting location and an ending location. The third stage 315 of FIG. 3 illustrates that the selection of the direction control 360 opens the direction entry page 380, which is shown in the fourth stage 317. The direction control is one of three mechanisms through which the mapping application can be directed to identify and display a route between two locations; the two other mechanisms are (1) a control in an information banner that is displayed for a selected item in the map, and (2) recent routes identified by the device that are displayed in the search field 365. Accordingly, the information banner control and the search field 365 are two UI tools that the application employs to make the transition between the different modalities seamless.

The fourth stage 317 shows that the direction entry page 380 includes starting and ending fields for providing starting and ending locations for a route, and a table that lists recent routes that the application has provided to the user. Other controls on this page are controls for starting a route, for reversing the order of the start and end locations, for canceling the direction request, for picking walking, auto, or public transit routes. These controls and other aspects of the mapping application are described in U.S. Provisional Patent Application 61/699,851, entitled "Voice Instructions During Navigation", filed Sep. 11, 2012, which is incorporated herein by reference. These controls and other aspects of the mapping application are also described in U.S. patent application Ser. No. 13/632,121, entitled "Context-Aware Voice Guidance"; this concurrently filed U.S. Patent Application is incorporated herein by reference.

The fourth stage 317 illustrates the user selecting one of the recent directions that was auto-populated in the table 382. The fifth stage 319 then shows three routes on a 2D map view between the specified start and end locations specified through the page 380. It also shows the selection of the second route and some information about this route in a bar at the top of the layout. This bar is shown to include start and end buttons 386 and 388. The start button 386 is shown to be selected in the fifth stage 319.

As shown by the sixth stage 321, the selection of the start button directs the application to enter a turn-by-turn navigation mode (e.g., starts the navigation presentation). In this example, the application has entered a 2D turn-by-turn navigation mode. In other embodiments, the application will enter by default into a 3D turn-by-turn navigation mode. In this mode, the application displays a realistic sign 384 that identifies the distance to the next juncture maneuver in the navigated route and some other pertinent information. The application also displays a top bar that includes some information about the navigation as well as End and Overview buttons, for respectively ending the navigation and obtaining an overview of the remaining portion of the navigated route or the entire portion of the navigated route in other embodiments.

The application further displays the floating 3D control and the floating list control, which were described above. It should be noted that the list control was adaptively added to the floating control cluster upon entering the route inspection and route navigation modalities, while the position indicator was removed from the floating control upon entering the route navigation modality. Also, upon transition from the route inspection mode to the route navigation mode, the application performs an animation in some embodiments that involves the page curl uncurling completely before the application transitions into the navigation presentation.

In some embodiments, the animation transition includes removing the top bar, its associated controls and the floating controls from the navigation presentation, and moving the sign 384 to the top edge of the presentation a short time period after starting the navigation presentation. As further described below, the application requires the user to tap on the navigated map to bring back the top bar, its controls and the floating controls, and requires another tap to remove these controls again from the map, in some embodiments. Other embodiments provide other mechanisms for viewing and removing these controls.

B. 2D and 3D Navigation

Figure 4:
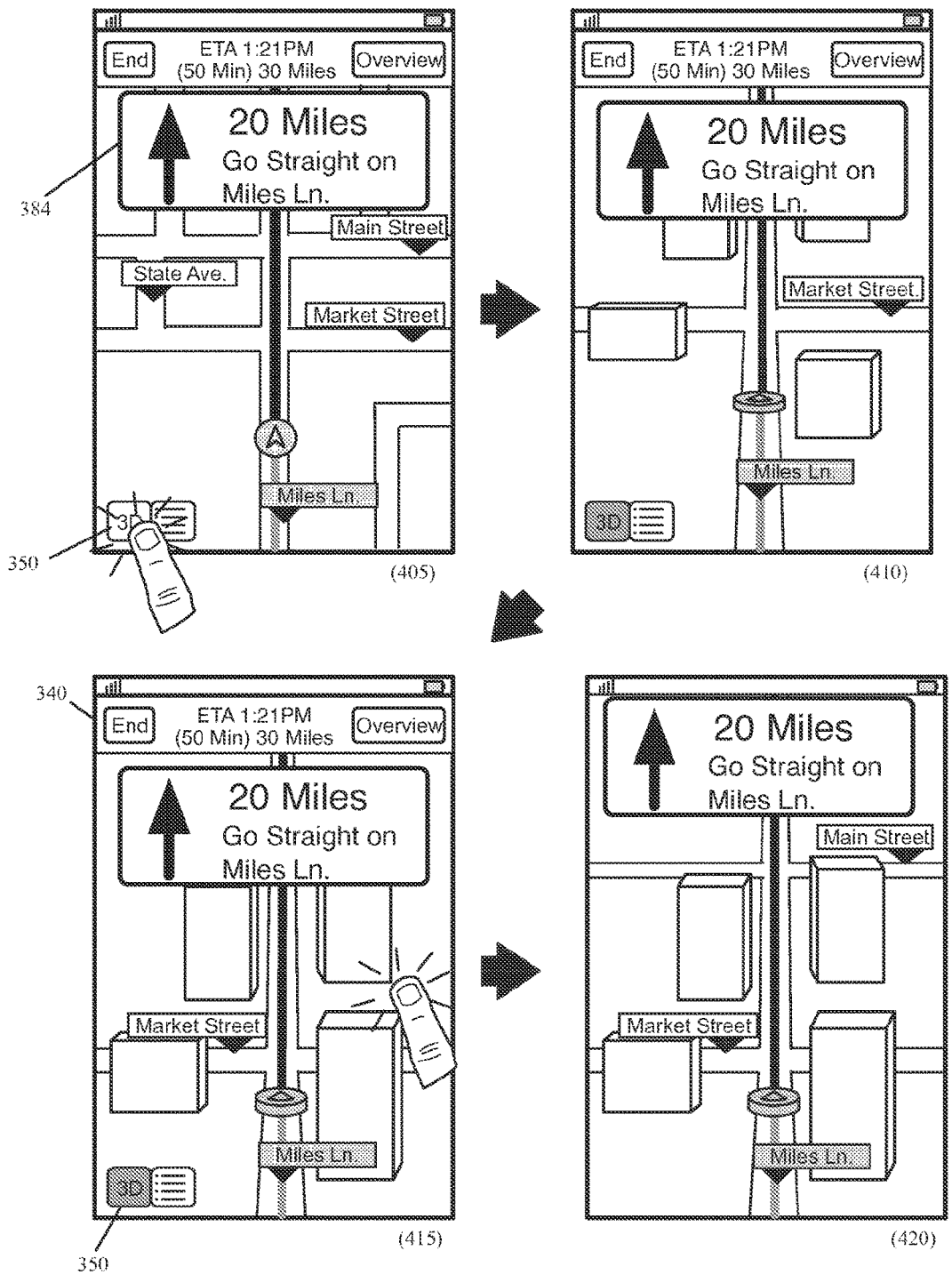
FIG. 4 illustrates how the navigation application of some embodiments provides a 3D control as a quick mechanism of entering a 3D navigating mode.

The navigation application of some embodiments can display a navigation presentation in either a 2D mode or a 3D mode. As mentioned above, one of the floating controls is the 3D control 350 that allows a user to view a navigation presentation in three dimensions (3D). FIG. 4 illustrates how the navigation application of some embodiments provides the 3D control 350 as a quick mechanism of entering a 3D navigating mode. This figure illustrates this operation in four operational stages 405-420. The first stage 405 illustrates the user selecting the 3D control 350 while viewing a two-dimensional navigation presentation.

The second stage 410 illustrates the navigation presentation in the midst of its transition into a 3D presentation. As shown in this figure, the 3D control appears highlighted at this stage to indicate that the navigation presentation has entered a 3D mode. As mentioned above, the navigation application generates the 3D view of the navigated map in some embodiments by rendering the map view from a particular position in the three dimensional scene that can be conceptually thought of as the position of a virtual camera that is capturing the map view. This rendering will be further described below by reference to FIG. 5.

The third stage 415 then illustrates the navigation presentation at the end of its transition into its 3D appearance. As shown by the difference between the heights of the buildings in the second and third stages, the transition from 2D to 3D navigation in some embodiments includes an animation that shows three-dimensional objects in the navigated map becoming larger.

The third stage 415 illustrates the user selecting the navigation presentation. As shown in the fourth stage 420, the selection resulted in the navigation application entering a full-screen mode. In this mode, the top bar 340 and the floating controls, including 3D control 350, are not shown. As such, the application displays the 3D map of the current location without obscuring with different user interface items. Here, the user can reselect the navigation presentation to exit the full-screen mode.

C. Road Signs in 2D and 3D Views

Figure 5:
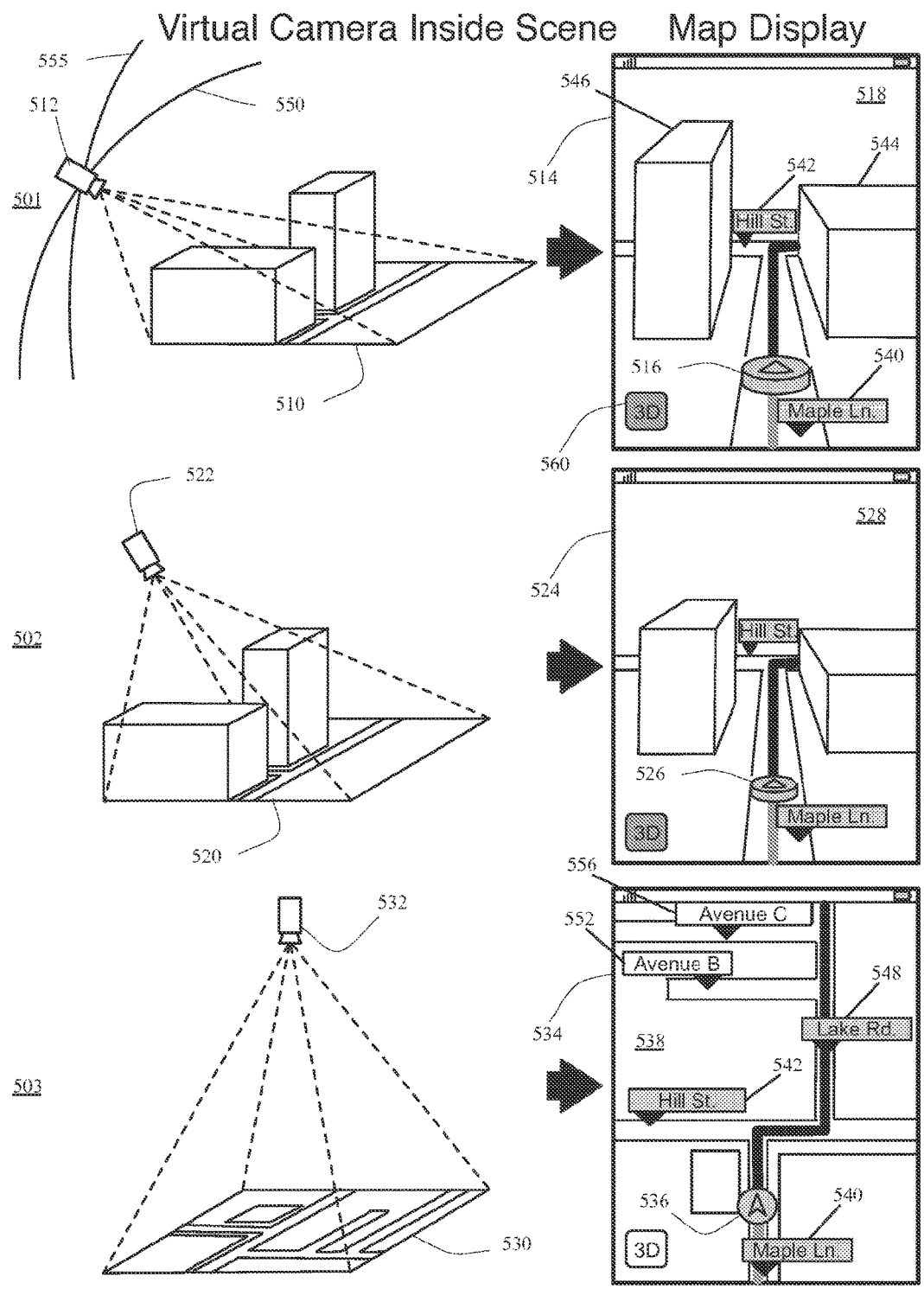
FIG. 5 illustrates an example of how road signs are presented in 2D and 3D.

The navigation application of some embodiments is capable of displaying navigation maps from multiple perspectives. The application can show a navigation presentation in three dimensions (3D) or in two dimensions (2D). In some embodiments, the application presents road signs in the 3D presentation and the 2D presentation. FIG. 5 illustrates an example of how road signs are presented in 2D and 3D. In this example, the 3D maps are generated simulations of a virtual scene as seen by a virtual camera. When rendering a 3D navigation map, a virtual camera is a conceptualization of the position in the 3D map scene from which the device renders a 3D view of the scene. FIG. 5 illustrates a location in a 3D navigation map scene 510 that includes four objects, which are two buildings and two intersecting roads. To illustrate the virtual camera concept, this figure illustrates three scenarios, each of which corresponds to a different virtual camera location (i.e., a different rendering position) and a different resulting view that is displayed on the device.

The first stage 501 shows the virtual camera 512 at a first position pointing downwards at an angle (e.g., a 30 degree angle) towards the 3D scene 510. By rendering the 3D scene from the position and angle shown in stage 501 the application generates the 3D map view 518. From this position, the camera is pointing at a location that is a moving position in front of the device. The virtual camera 512 is kept behind the current location of the device. "Behind the current location" in this case means backward along the navigation application's defined path in the opposite direction from the current direction that the device is moving in.

The navigation map view 518 looks as though it was shot by a camera from above and behind the device's location indicator 516. The location and angle of the virtual camera places the location indicator 516 near the bottom of the navigation map view 518. This also results in the majority of the screen being filled with the streets and buildings ahead of the present location of the device. In contrast, in some embodiments, the location indicator 516 (which is a colored puck in this example) is in the center of the screen, with half of the screen representing things ahead of the device and the other half representing things behind the device.

The second stage 502 shows the virtual camera 522 at a different position, pointing downwards towards the scene 520 at a larger second angle (e.g., −45°). The application renders the scene 520 from this angle, resulting in the 3D navigation map view 528. The buildings and the roads are smaller than their illustration in the first navigation map view 518. Once again, the virtual camera 522 is above and behind the location indicator 526 in the scene 520. This again results in the location identifier appearing in the lower part of the 3D map view 528. The location and orientation of the camera also result again in the majority of the screen displaying things ahead of the car, which is what someone navigating needs to know.

In the first two stages 501 and 502, the 3D navigation scenes display several road signs 540 and 542. The road sign 540 is for a road along the navigated route, while the road sign 542 is for a maneuver junction that is closest to the current position of the user. The current position is indicated by the graphical object 130 (which is a colored puck in this example).

The road signs 540 and 542 are presented by the navigation application as vertically standing objects in the 3D perspective navigation scenes. This vertical appearance is meant to simulate vertically standing road signs in the real world that the user passes along the navigated route. In some embodiments, the application augments the realistic look of such road signs by generating and displaying shadows for these road signs in the 3D scene, and/or by making the appearance of these road signs similar or identical to their appearance or expected appearance in the real world. Also, in some embodiments, the road signs are not made to look perfectly vertical in the 3D scene, but rather are made to look practically vertical, e.g., to be within a particular angle (e.g., 0 to 45 degrees) of such a vertical alignment.

When rendering a 3D presentation, the navigation application of some embodiments takes into account buildings and other constructs in a 3D presentation when dynamically presenting road signs. For example, the road sign 542 is positioned such that it is not hidden behind the building 544 or 546. The application may also eliminate road signs that might not be fully visible in a 3D presentation.

The third stage 503 shows the virtual camera 512 at a top-down view that looks downwards on a location on a 2D map that corresponds to the location in the 3D map scene 510 that was used to render the 3D views 518 and 528. The scene that is rendered from this perspective is the 2D map view 538. Unlike the 3D rendering operations of the first and second stages that in some embodiments are perspective 3D rendering operations, the rendering operation in the third stage is relatively simple as it only needs to crop a portion of the 2D map that is identified by a zoom level specified by the application or the user. Accordingly, the virtual camera characterization in this situation somewhat unnecessarily complicates the description of the operation of the application as cropping a portion of a 2D map is not a perspective rendering operation.

Different from the first two stages 501 and 502, the third stage 503 illustrates that the 2D view 538 shows additional road signs 548, 552, and 556. These road signs are not shown in the 3D map views (518 and 528) because the 2D view 538 shows a larger mapped area. In the example illustrated in the third stage 501, the road signs 540 and 542 retains their appearances from the 3D view. However, the road signs are shown as flat labels and not as vertically standing objects. In some embodiments, the navigation application does not change the appearance of road signs when switching from a 3D presentation to a 2D presentation, or vice versa. For example, the road signs 540 and 542 may appear as vertically standing objects or flat labels in both the 2D and 3D presentations.

The preceding example was described with reference to a virtual camera. In some embodiments, the virtual camera can be made to move by changing the zoom level for viewing the map after the map enters a 3D mode, as further described below. In some of these embodiments, the application switches to a top-down mode (where the rendering position faces straight down) that produces 2D views when the zoom level reaches a particular zoom out level. As in the third stage 503, the mapping application in some embodiments switches from rendering a 3D scene from a particular perspective direction to cropping a 2D scene when the camera switches from the 3D perspective view to a 2D top-down view. This is because in these embodiments, the application is designed to use a simplified rendering operation that is easier and that does not generate unnecessary perspective artifacts. In other embodiments, however, the mapping application uses perspective rendering operations to render a 3D scene from a top-down virtual camera position. In these embodiments, the 2D map view that is generated is somewhat different from the map view 538 illustrated in the third stage 520, because any object that is away from the center of the view is distorted, with the distortions being greater the further the object's distance from the center of the view.

The virtual camera 512 moves along different trajectories in different embodiments as the zoom level changes for the map view. Two such trajectories 550 and 555 are illustrated in FIG. 5. In both these trajectories, the camera moves in an arc and rotates more downward as the camera moves upwards on the arc. The trajectory 555 differs from the trajectory 550 in that in the trajectory 555 the camera moves backwards from the current location as it moves up the arc.

While moving along one of the arcs, the camera rotates to maintain a point ahead of the location indicator at the focal point of the camera. In some embodiments, the user can turn off the three dimensional view and go with a purely two-dimensional view. For example, the applications of some embodiments allow a three dimensional mode to be turned on and off by use of a 3D button 560. The 3D button 560 is essential to turn-by-turn navigation feature, where it has a role as an indicator and toggle. When 3D is turned off, the camera will maintain a 2D navigation experience, but when 3D is turned on, there may still be some top-down perspectives when 3D viewing angles don't make sense (e.g., when going around a corner that would be obstructed in 3D mode).

II. Road Sign Considerations

An example process for dynamically presenting road signs will be described below. However, before describing the process, several example considerations that can factor into how the navigation application of some embodiments generates the road signs will now be described.

A. Utility

Figure 6:
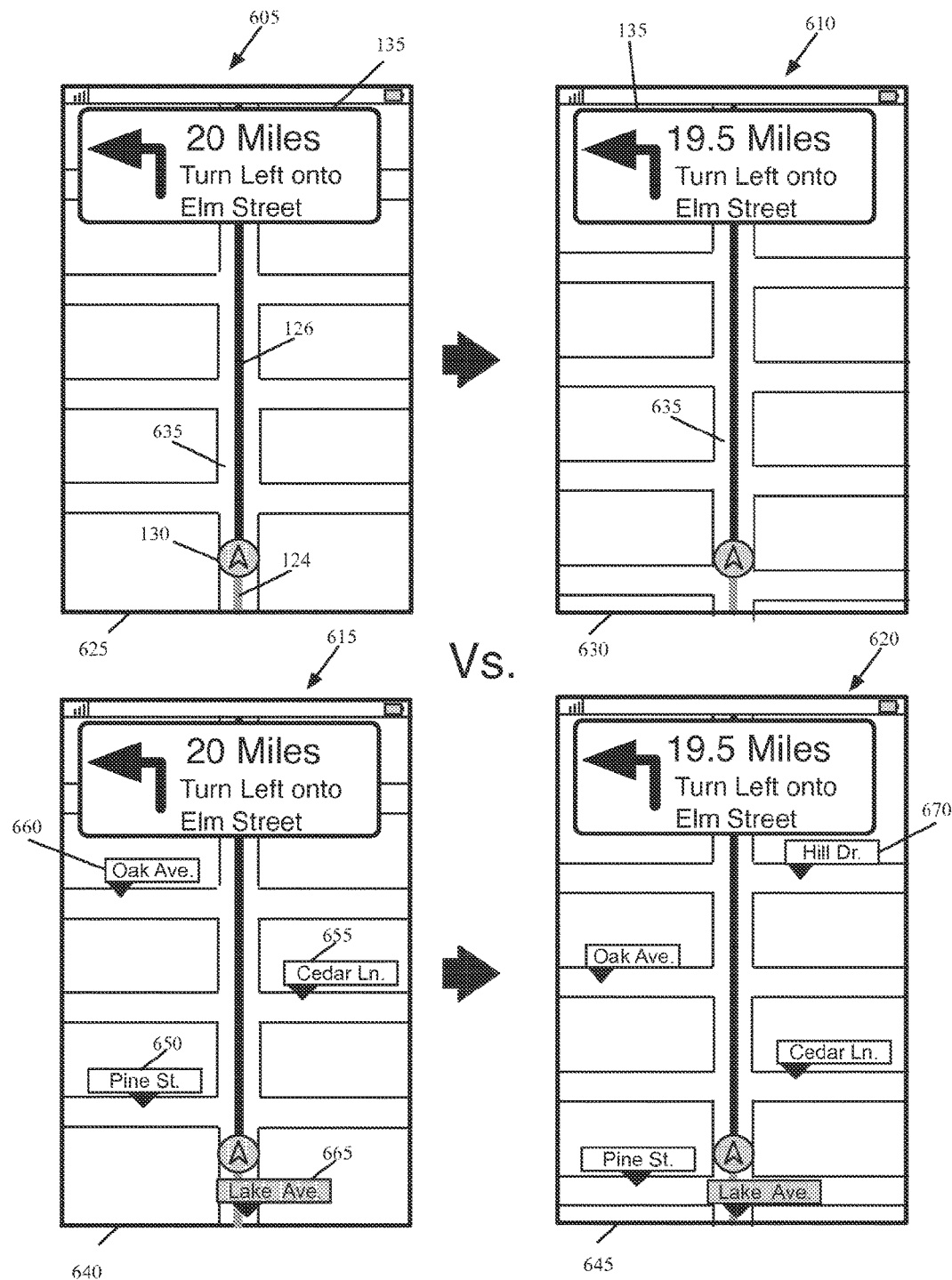
FIG. 6 illustrates a first navigation presentation without any road signs and a second navigation presentation with road signs.

As mentioned above, the application of some embodiments shows road signs for utility purposes. Specifically, the road signs provide some context for the navigation instructions, and help the user associate the instructions during navigation with the area that the user is navigating in the real world. FIG. 6 illustrates two contrasting navigation presentations. The first presentation includes two stages 605 and 610 of operations that relate to two different positions of the device along a navigated route. This first presentation is shown without any road signs. The second presentation is similar to the first presentation but shows two stages 615 and 620 with road signs.

The first stage 605 of the first presentation shows a first scene 625 of the first navigation presentation. The scene includes a road 635 that is along the navigated route, as indicated by a graphical object 130 (which is a colored puck in this example), a first color line 124 that trails this object, a second color line 126 that leads this object, and a banner 135. This presentation also includes several other roads that intersect the navigated route. These roads are non-maneuver junctions. No road signs are shown in this scene of the first navigation presentation.

The second stage 610 shows a second scene 630 of the first navigation presentation after the user has moved some distance towards the destination. However, there is very little context in relation to the current location of the user. The scene 630 is similar to the one shown in the previous stage 605. The scene shows the road 635 with several non-maneuver junctions that cross that road. Similar to the previous stage, no road signs are shown in the second scene. The main difference between the first and second stages 605 and 610 is that the banner 135 has been updated to state that the user is closer in distance to the next maneuver junction.

The first stage 615 of the second presentation shows a first scene 640 of the second navigation presentation. This scene 640 is identical to the first scene 625 of the first presentation. However, the scene 640 includes several road signs 650, 655, 660, and 665. The scene includes a road sign 665 for the road that is along the navigated route. The scene also includes road signs 650, 655, and 660 for roads that intersect the navigated route. These road signs provide some context in relation to the current location of the user. Providing such road signs can be useful as it allows the user to identify different roads along the route. By identifying such roads, the user can take a different route to move towards the same destination or to move towards another destination.

The second stage 620 of the second presentation shows a second scene 645 of the second navigation presentation. This scene is similar to the previous stage 615. However, the scene 645 includes one additional road sign 670 for a road that intersects the navigated route. In this example, the road sign 670 provides visual feedback to the user that he or she is moving along the route. This is different from the second stage 610 of the first presentation, which provides less visual feedback in relation to the movement of the user along the route.

In the example illustrated in the first and second stages 615 and 620 of the second presentation, the navigation application has identified different non-maneuver junctions along the route and presented road signs for those junctions. As mentioned above, the navigation application may also present road signs at junctions along the navigated route that require a change of direction. In some embodiments, the application differentiates the appearance of road signs at junctions along the navigated route that require a change of direction from road signs at junctions along the route that do not require a change of direction. For example, the application may display the different types of road sign using different colors. The different appearances of the road signs can be useful because they allow the application's user to distinguish important roads (e.g., maneuver junctions) from other less important roads (e.g., non-maneuver junctions).

B. Aesthetic Distribution of Road Signs

Figure 7:
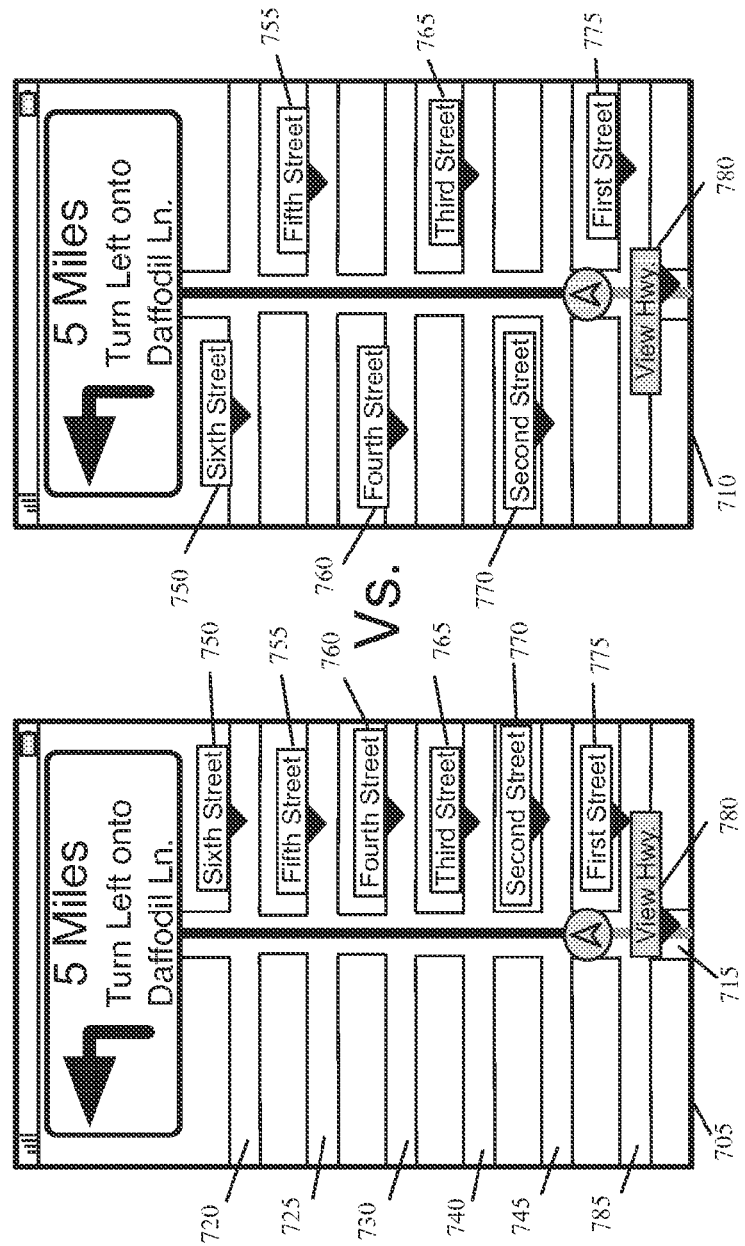
FIG. 7 illustrates two contrasting scenes of a same location along a navigated route.

In some embodiments, the navigation application performs operations to ensure that it arranges road signs on a map in an aesthetically pleasing manner. These operations may entail evenly distributing the road signs about a navigated route as much as possible. FIG. 7 illustrates two contrasting scenes 705 and 710 of a same location along a navigated route. In particular, the scene 705 illustrates how the location appears when road sign aesthetics are not taken into consideration, while the scene 710 illustrates how the same location appears when road sign aesthetics are taken into consideration.

The scene 705 shows a road 715 along the navigated route and several other roads 720, 725, 730, 740, 745, and 785 that intersect that road. The scene also shows a road sign 780 for the road 715 along the navigated route, and road signs 750-775 for the roads that intersect the road 715. As the scene is rendered without taking into account road sign aesthetics, the road signs 750-775 are arranged on one side of the navigated route. Specifically, the right-hand side of the navigated route is cluttered with the road signs 750-775, while the left-hand side of the navigated route has no road signs.

The scene 710 illustrates how the same location appears when road sign aesthetics are taken into consideration. In factoring in the aesthetics of the presentation, the application has arranged the road signs such that they do not appear on one side of the navigated route. In this example, the road signs 750-775 alternate evenly between the left-hand and right-hand sides of the navigated route. In addition, the road sign 780 for the road along the navigated route is displayed as extending out towards the left-hand side of the navigated route so that it is not shown on the same side as the next road sign 775, which is on the right-hand side of the navigated route. In evenly distributing the road signs, the application of some embodiments starts from the direction of travel of the user along the navigated route, iterates through the succeeding identified road signs for display, and if possible places each road sign in each iteration on a different side of the navigated route.

In the previous example, the application of some embodiments alternates road signs for roads that intersect or overlap with the navigated route. In some embodiments, the navigation application arranges other nearby roads so that they appear as alternating between opposite sides of the navigated route. For instance, when there are a few or no intersecting or overlapping roads, the application may select several nearby roads based on their position with respect to the navigated route. The application may then show road signs for the selected roads as alternating evenly between the different sides of the navigated route.

C. Number of Road Signs

Figure 8:
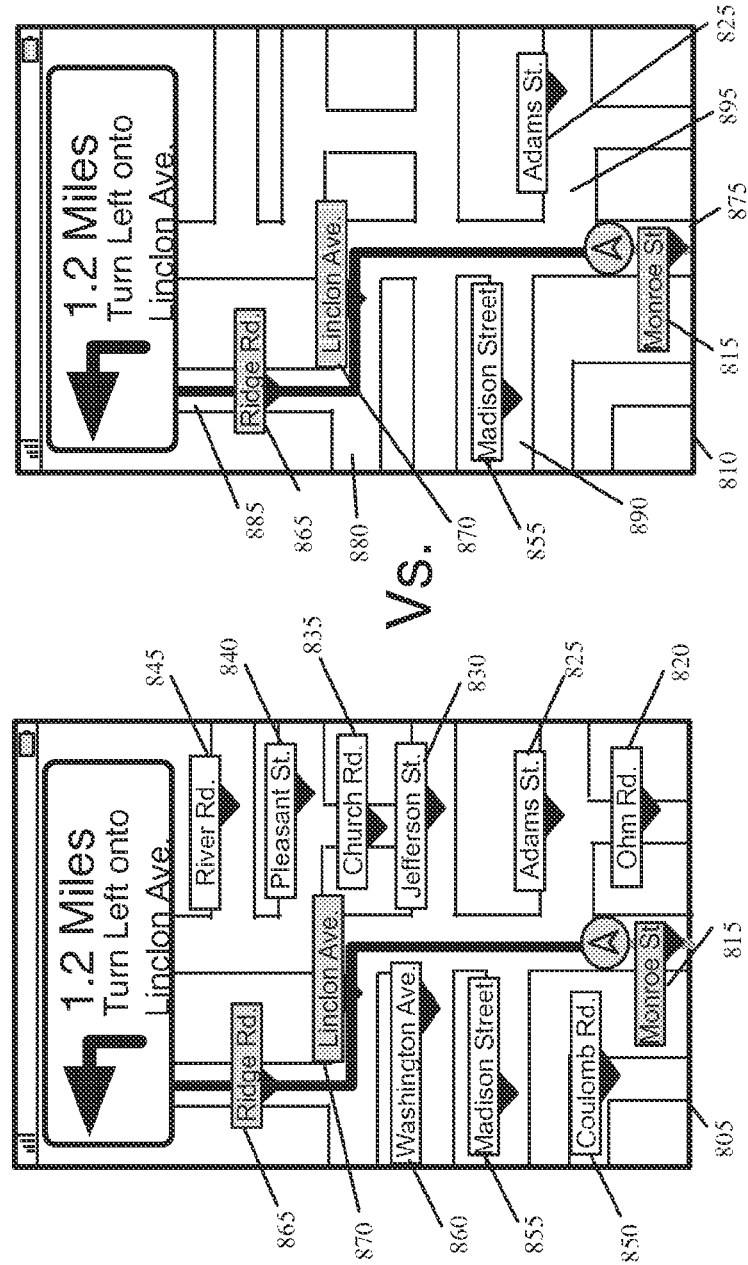
FIG. 8 illustrates a first scene that does not take into account the maximum number of road signs, and a second scene that does take into account the maximum number of road signs.

In some embodiments, the navigation application performs operations that ensure that it does not place too many or too few road signs in one view of a navigation presentation. As mentioned above, the application of some embodiments uses a predetermined or user-defined maximum and minimum numbers of road signs that can appear in the view at any given time. Based on these numbers, the application then identifies the roads for which it should show road signs. FIG. 8 illustrates two contrasting scenes 805 and 810 of a same location along a navigated route. In particular, the scene 805 illustrates how the location appears when the maximum number is not taken into consideration, while the scene 810 illustrates how the same location appears when the maximum number is taken into consideration.

As shown in FIG. 8, the scene 805 shows several roads along the navigated route and several other roads (e.g., intersecting roads, nearby roads). The scene 805 is cluttered with road signs 815-870. The scene 805 shows a road sign 815 for the road along the navigated route, and road signs 820-870 for all the other roads. All these road signs 815-870 are shown because the scene is rendered without taking into account the maximum number of road signs that can appear in one scene.

The scene 810 illustrates how the same location appears when the maximum number is taken into consideration. The scene 810 is not cluttered with road signs. The navigation application has selected several roads 875-895, and then dynamically presented road signs for only those selected roads. Specifically, the scene shows road sign 815, 865, and 870 for the roads 875, 885, and 880 that are along the navigated route. The scene also shows two road signs 825 and 855 for two roads 895 and 890 that intersect the navigated route.

In some embodiments, the navigation application categorizes different roads, and uses the categorization to select several roads. The application then displays road signs for only those selected roads. For example, when there are too many road signs, the application might display road signs for several important roads (e.g., for roads that are along a navigated route, for maneuver junctions) and not display road signs for less important roads (e.g., for non-maneuver junctions, for other nearby roads). Several examples of selectively presenting road signs will now be described below by reference to FIGS. 9 and 10.

1. Number of Intersecting/Overlapping Roads

Figure 9A:
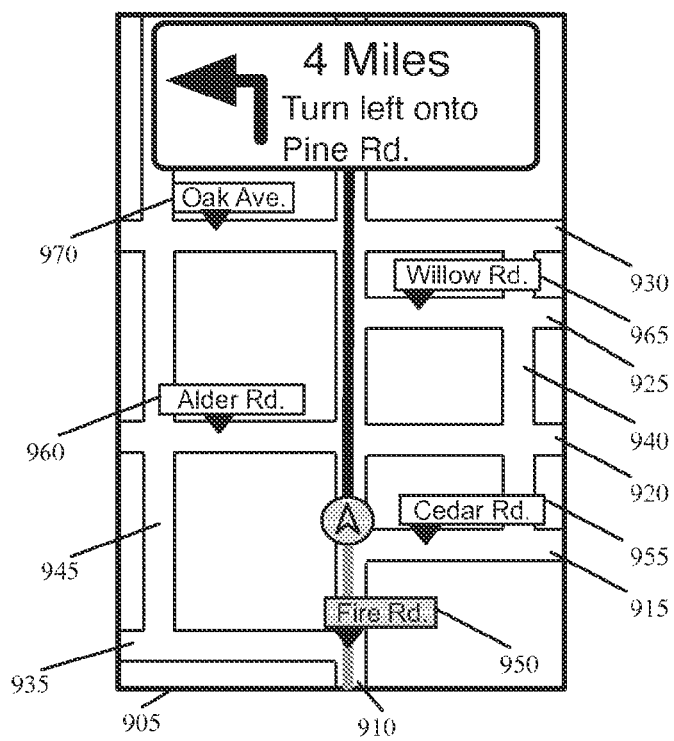
FIG. 9A illustrates an example of how the navigation application presents road signs when there are many roads that intersect or overlap a navigated route.

FIG. 9A illustrates an example of how the navigation application presents road signs when there are many roads that intersect or overlap a navigated route. Specifically, this figure illustrates how the navigation application selectively presents road signs for intersecting or overlapping roads over other nearby roads.

As shown in FIG. 9A, the scene 905 shows a road 910 along a navigated route and several other roads 915-945. The roads 915-935 intersect or meet the route in the scene, while the roads 940 and 945 are nearby streets that do not intersect or meet the route. In this example, the navigation application has selected the road 910 along the navigated route and presented a road sign 950 for that road. The application has also selected several of the intersecting roads 915-930 and presented road signs 955-970 for these roads. For instance, the application may select as many intersecting roads as possible based on a threshold value. In other words, instead of showing road signs for the nearby roads 940 and 945, the application has selected a group of roads 915-930 that intersects the navigated route, and presented road signs 955-970 for only those roads that are in the group. The intersecting road 935 might not have been selected because the maximum number of road signs to show in one view has been reached and/or the user has crossed that road.

Figure 9B:
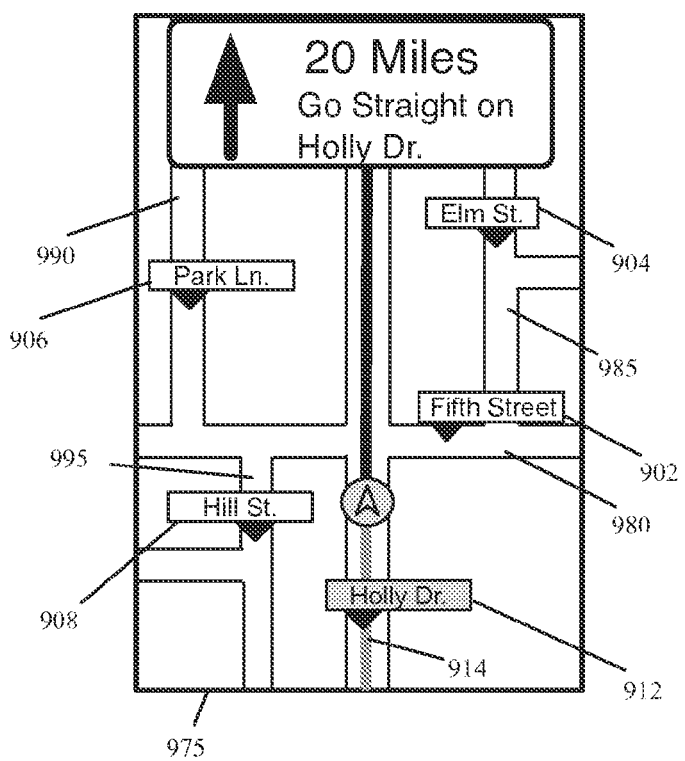
FIG. 9B illustrates an example of how the navigation application presents road signs when there are a few roads that intersect or overlap a navigated route.

When there are a few intersecting or overlapping roads, the navigation application of some embodiments performs operations that ensure that it presents road signs for other nearby roads. FIG. 9B illustrates an example of how the navigation application presents road signs when there are a few roads that intersect or overlap a navigated route.

As shown in FIG. 9B, the scene 975 shows a road 914 along a navigated route and several other roads 980-995. The road 980 intersects the route in the scene, while the roads 985-995 are nearby streets that do not intersect the route. In this example, the navigation application has selected the road 914 along the navigated route and presented a road sign 912 for that road. Also, the application has selected the road 980 that intersect the route and presented a road sign 902 for the intersecting road. In addition, the application has selected several of the nearby roads 985-995 and presented road signs 904-908 for these roads. That is, as there is only one road 980 that intersects the navigated route, the application has selected a group of nearby roads 985-995 that do not intersect the navigated route, and presented road signs 904-908 for those roads that are in the group.

The previous example illustrated a scenario where there are a few roads that intersect or overlap a navigated route. In some embodiments, the navigation application performs operations that ensure that it presents at least one or more road signs when there are no intersecting or overlapping roads. This can occur in a number of different scenarios. For instance, the application's user might be traveling down a long stretch of highway without a nearby exit, or traveling down a rural area with a few parallel roads and no intersecting or overlapping roads.

Figure 10:
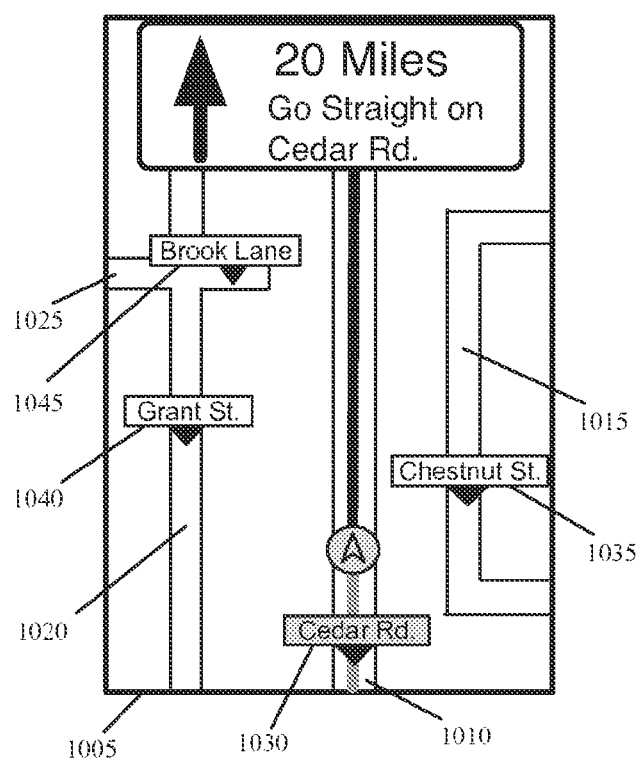
FIG. 10 illustrates an example of presenting road signs when there are no intersecting or overlapping roads.

As shown in FIG. 10, the scene 1005 shows a road 1010 along a navigated route and several other roads 1015-1025. In this scene, the roads 1015-1025 do not intersect the navigated route. One or more of these roads may never intersect the navigated route. Here, the navigation application has selected the road 1010 along the navigated route and presented a road sign 1030 for that road. The application has also selected several of the nearby roads 1015-1025 and presented road signs 1035-1045 for these roads. That is, as there are no intersecting or overlapping roads, the application has selected a group of nearby roads 1015-1025 that do not intersect the navigated route, and presented road signs 1035-1045 for those roads that are in the group. One or more of these roads may never meet the navigated route. However, the application has provided the road signs 1035-1045 to provide some feedback as to where the user is along the route.

D. Categorization

In several of the examples described above, the navigation application presents road signs for several selected roads. To perform the selection operations, the navigation application of some embodiments categorizes different types of roads into different tiers. Several different example categorization schemes will now be described by reference to FIG. 11.

Figure 11A:
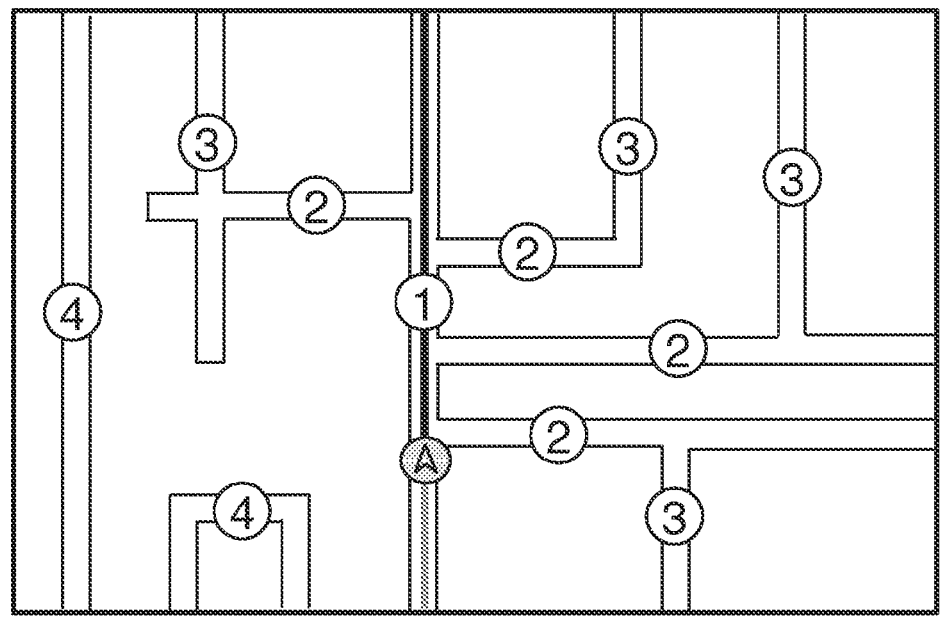
FIG. 11A illustrates one example of how the application of some embodiments categorizes different type of roads.

FIG. 11A illustrates one example of how the application of some embodiments categorizes different type of roads. In this example, the application has categorized a road on the navigated route as tier 1. The application has also categorized all roads that intersect or overlap with the navigated route as tier 2. In addition, the application has categorized all roads that intersect the tier 2 roads as tier 3. All other roads have been categorized as tier 4 roads.

Figure 11B:
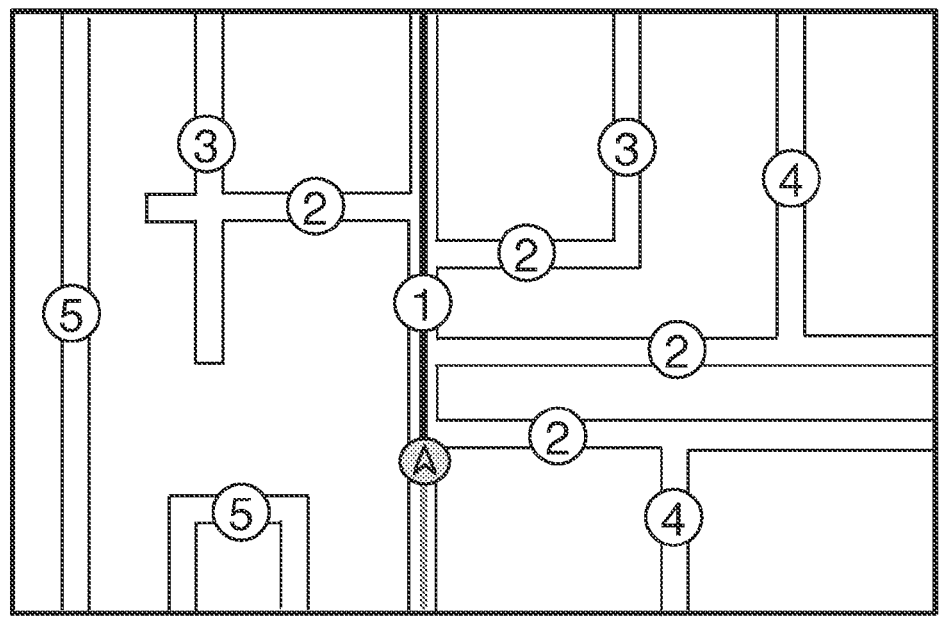
FIG. 11B illustrates another example of how the application of some embodiments categorizes different type of roads.

The navigation application of other embodiments defines the road tiers differently. FIG. 11B illustrates another example of how the application of some embodiments categorizes different type of roads. In this example, the application categorizes roads that intersect the above mentioned tier 2 roads differently based on the distance of these roads to the navigated route, and/or based on the time it would take for the device to reach these roads from the navigated route.

As shown in FIG. 11B, the application has categorized the road on the navigated route as tier 1. The application has also categorized all roads that intersect or overlap with the navigated route as tier 2. Different from FIG. 11A, the application has categorized all roads that intersect the tier 2 roads as tier 3 when these roads are within a threshold distance of the navigated route and/or when these roads can be reached from the navigated route within a threshold time. Furthermore, the application has categorized all roads that intersect the tier 2 roads as tier 4 when these roads are not within a threshold distance of the navigated route and/or when these roads cannot be reached from the navigated route within a threshold time. Lastly, the application has categorized all other roads as tier 5 roads. Still other embodiments use other mechanisms to categorize roads and/or have other number of tiers. The navigation application of other embodiments defines the road tiers differently.

E. Distance and Time

In some embodiments, the navigation application performs operations that ensure that it presents road signs for roads differently based on the distance of these roads to the navigated route, and/or based on the time it would take for the device to reach these roads from the navigated route. Several examples of such presentations will now be described by reference to FIG. 12.

Figure 12A:
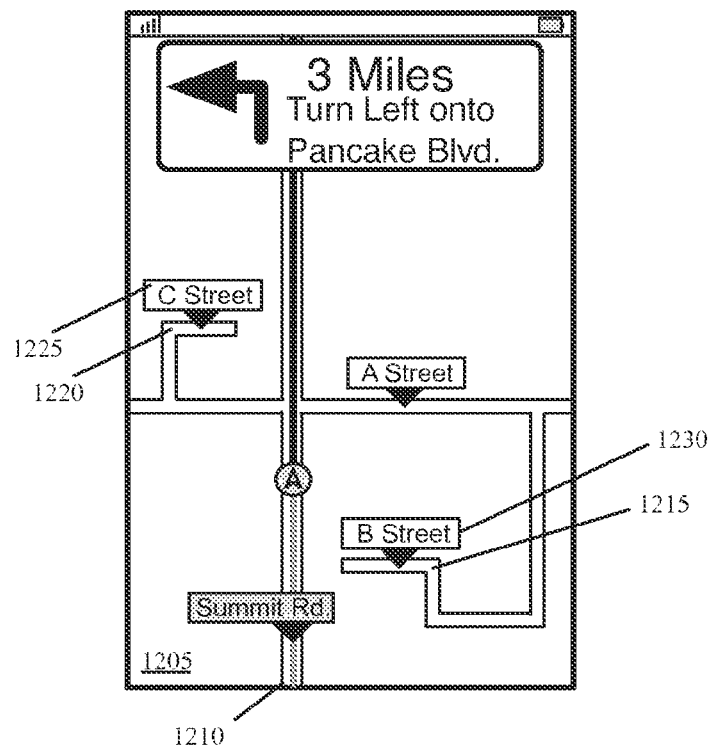
FIG. 12A illustrates an example of how the navigation application of some embodiments presents road signs based on distance.

FIG. 12A illustrates an example of how the navigation application of some embodiments presents road signs based on the distance of these roads to the navigated route. As shown, the scene 1205 shows a road 1210 along a navigated route and several other roads, including roads 1215 and 1220. In this example, the navigation application has presented road signs 1225 and 1230 for the roads 1220 and 1215. These road signs were presented based on a straight-line distance from each road (e.g., from the closest point of the road) to the navigated route.

Figure 12B:
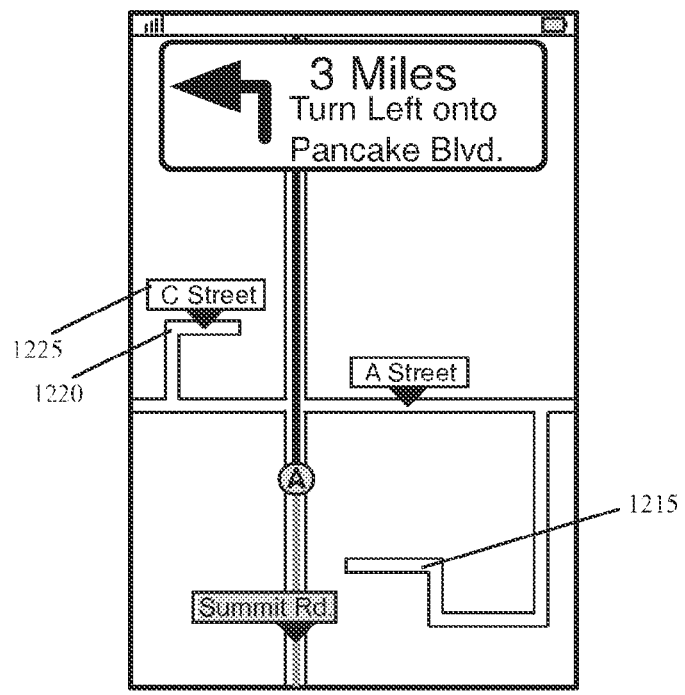
FIG. 12B illustrates an example of how the navigation application of some embodiments presents road signs based on the time.

In the previous example, the navigation application has presented road signs 1225 and 1230 based on the distance of these roads 1215 and 1220 from the navigated route. However, as shown in FIG. 12A, it takes a longer time to reach the road 1215 from the navigated route than it would to reach the road 1220. FIG. 12B illustrates an example of how the navigation application of some embodiments presents road signs based on the time it would take for the device to reach these roads from the navigated route. Specifically, this example illustrates how the navigation application does not show a road sign for a road that takes a long time to reach, even though that road is close to the navigated route. This example is similar to the previous example. However, the navigation application has presented the road sign 1225 for the road 1220 but has not presented the road sign 1230 for the road 1215.

The preceding section described several example factors that the navigation application of some embodiments might consider when presenting road signs. For example, the application might consider the distance factor without the time factor. In some embodiments, the application considers other factors such as road classification (e.g., highway, small roads or local roads, arterials or major roads, freeways, collectors that collect traffic from local roads and distribute it to arterials, etc.). For instance, when there are a number of different junctions (e.g., non-maneuver junctions), the application may choose to present road signs for major roads or highways instead of smaller roads. In addition, the application may consider whether a particular road is connected to the navigated route.

III. Example Process for Labeling a Navigation Presentation

Figure 13:
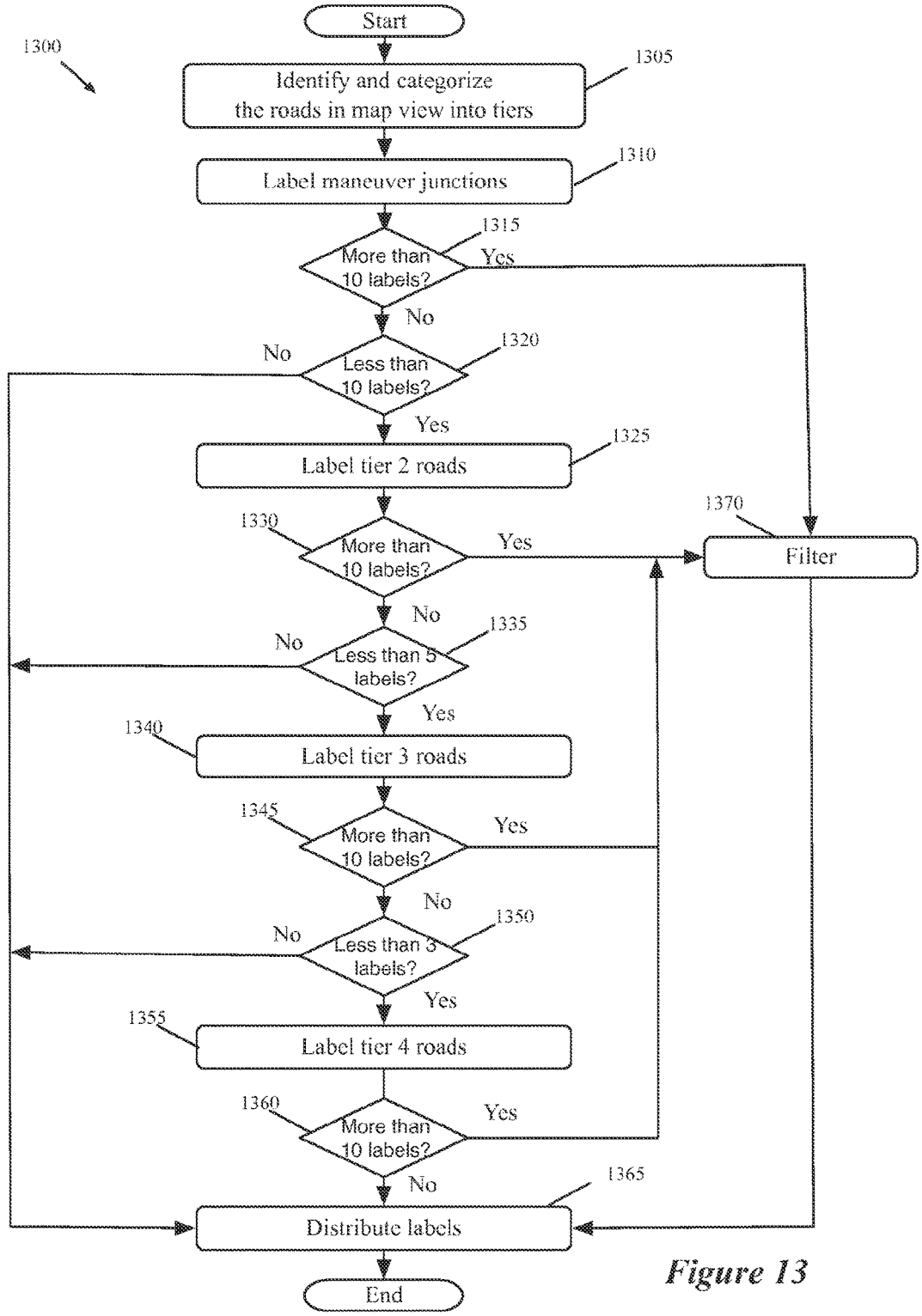
FIG. 13 conceptually illustrates a process that some embodiments use to label a navigation presentation with road signs.

The previous section described several example considerations that can factor into how the navigation application of some embodiments labels a navigation presentation with road signs. FIG. 13 illustrates a process 1300 that some embodiments use to label a navigation presentation with road signs. This process starts in some embodiments when the navigation application is directed to start a navigation presentation to provide navigation instructions to allow a user to navigate between two locations.

As shown in FIG. 13, the process initially identifies (at 1305) the roads in a map view and categorizes these roads into tiers. As mentioned above, the navigation application in some embodiments categorizes the roads into tiers in order to select the road signs for display. After categorizing the roads into several tiers, the process labels (at 1310) junctions where the user has to make a maneuver to stay on a navigation route.

Next, the process determines (at 1315) whether there are more than ten labels. If so, the process proceeds to 1370, which is described below. Otherwise, the process determines (at 1320) whether there are less than ten labels. When there are less than ten labels, the process labels (at 1325) tier 2 roads. In some embodiments, tier 2 roads are those that intersect or overlap the navigated route. Alternatively, tier 2 roads may not include any overlapping roads; or may include them as long as they are connected to the navigated route, or they can be reached within a certain amount of time. If the determination is made that there are ten labels, the process proceeds to 1365, which is described below.

After labeling tier 2 roads, the process determines (at 1330) whether there are more than ten labels. If so, the process proceeds to 1370, which is described below. Otherwise, the process determines (1335) whether there are less than five labels. When there are less than five labels, the process labels (at 1340) tier 3 roads. In some embodiments, a tier 3 road is a road that is one hop or two hops (e.g., turns, steps, maneuvers) from a tier 2 road. If the determination is made that there are five labels, the process proceeds to 1365, which is described below.

After labeling tier 3 roads, the process determines (at 1345) whether there are more than ten labels. If so, the process proceeds to 1370, which is described below. Otherwise, the process determines (at 1350) whether there are less than three labels. When there are less than three labels, the process labels (at 1355) tier 4 roads. In some embodiments, tier 4 roads include all other roads that may or may not be connected to the navigated route.

After labeling tier 4 roads, the process determines (at 1360) whether there are more than ten labels. When there are more than ten labels, the process performs (at 1370) a filtering operation. The process may use any one or more different filtering operations. One example filtering operation is to eliminate labels that are furthest from the direction of travel that is non-junction based. In some cases, such a filter operation can lead to road labels being cluttered in one area that is closer to the current location. Accordingly, the process might perform a combination of filtering operations so that road signs are not cluttered in one area. In some embodiments, the application considers other factors such as road classification (e.g., highway, small roads or local roads, arterials or major roads, freeways, collectors that collect traffic from local roads and distribute it to arterials, etc.). For instance, when there are a number of different junctions (e.g., non-maneuver junctions), the application may choose to present road signs for major roads or highways instead of smaller roads.

As shown in FIG. 13, the process then distributes (at 1365) the labels. In some embodiments, the process starts from the direction of travel of the user along the navigation route, iterates through the succeeding identified road signs for display, and if possible places each road sign in each iteration on a different side of the navigated route, in order to distribute evenly the road signs about the navigated route as much as possible. The process then ends.

The specific operations of the process 1300 may not be performed in the exact order shown and described. The specific operations may not be performed in one continuous series of operations, and different specific operations may be performed in different embodiments. For example, the numbers (i.e., ten, five, three) are threshold numbers that can be changed in various different ways. In addition, the process of some embodiments utilizes a different tier system (e.g., a three-tier system, a five-tier system). In such a case, the process may perform additional operations or fewer operations in presenting road signs. Furthermore, each of these process could be implemented using several sub-processes, or as part of a larger macro process.

IV. Electronic System

Many of the above-described features and applications are implemented as software processes that are specified as a set of instructions recorded on a computer readable storage medium (also referred to as computer readable medium). When these instructions are executed by one or more computational or processing unit(s) (e.g., one or more processors, cores of processors, or other processing units), they cause the processing unit(s) to perform the actions indicated in the instructions. Examples of computer readable media include, but are not limited to, CD-ROMs, flash drives, random access memory (RAM) chips, hard drives, erasable programmable read-only memories (EPROMs), electrically erasable programmable read-only memories (EEPROMs), etc. The computer readable media does not include carrier waves and electronic signals passing wirelessly or over wired connections.

In this specification, the term "software" is meant to include firmware residing in read-only memory or applications stored in magnetic storage which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

A. Mobile Device

Figure 14:
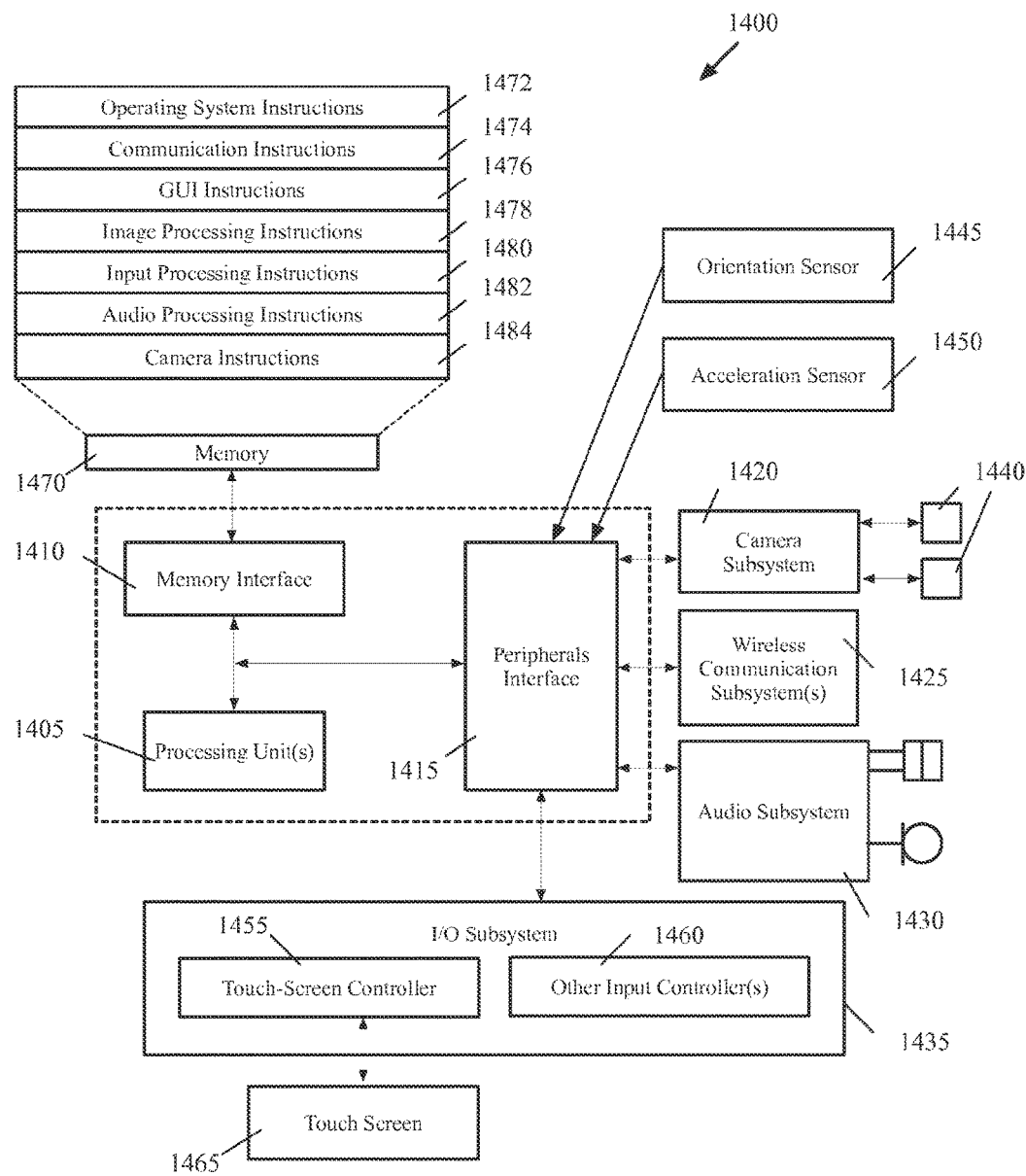
FIG. 14 illustrates an example architecture for a mobile computing device

The mapping and navigation applications of some embodiments operate on mobile devices, such as smart phones (e.g., iPhones®) and tablets (e.g., iPads®). FIG. 14 is an example of an architecture 1400 of such a mobile computing device. Examples of mobile computing devices include smartphones, tablets, laptops, etc. As shown, the mobile computing device 1400 includes one or more processing units 1405, a memory interface 1410 and a peripherals interface 1415.

The peripherals interface 1415 is coupled to various sensors and subsystems, including a camera subsystem 1420, a wireless communication subsystem(s) 1425, an audio subsystem 1430, an I/O subsystem 1435, etc. The peripherals interface 1415 enables communication between the processing units 1405 and various peripherals. For example, an orientation sensor 1445 (e.g., a gyroscope) and an acceleration sensor 1450 (e.g., an accelerometer) is coupled to the peripherals interface 1415 to facilitate orientation and acceleration functions.

The camera subsystem 1420 is coupled to one or more optical sensors 1440 (e.g., a charged coupled device (CCD) optical sensor, a complementary metal-oxide-semiconductor (CMOS) optical sensor, etc.). The camera subsystem 1420 coupled with the optical sensors 1440 facilitates camera functions, such as image and/or video data capturing. The wireless communication subsystem 1425 serves to facilitate communication functions. In some embodiments, the wireless communication subsystem 1425 includes radio frequency receivers and transmitters, and optical receivers and transmitters (not shown in FIG. 14). These receivers and transmitters of some embodiments are implemented to operate over one or more communication networks such as a GSM network, a Wi-Fi network, a Bluetooth network, etc. The audio subsystem 1430 is coupled to a speaker to output audio (e.g., to output voice navigation instructions). Additionally, the audio subsystem 1430 is coupled to a microphone to facilitate voice-enabled functions, such as voice recognition (e.g., for searching), digital recording, etc.

The I/O subsystem 1435 involves the transfer between input/output peripheral devices, such as a display, a touch screen, etc., and the data bus of the processing units 1405 through the peripherals interface 1415. The I/O subsystem 1435 includes a touch-screen controller 1455 and other input controllers 1460 to facilitate the transfer between input/output peripheral devices and the data bus of the processing units 1405. As shown, the touch-screen controller 1455 is coupled to a touch screen 1465. The touch-screen controller 1455 detects contact and movement on the touch screen 1465 using any of multiple touch sensitivity technologies. The other input controllers 1460 are coupled to other input/control devices, such as one or more buttons. Some embodiments include a near-touch sensitive screen and a corresponding controller that can detect near-touch interactions instead of or in addition to touch interactions.

The memory interface 1410 is coupled to memory 1470. In some embodiments, the memory 1470 includes volatile memory (e.g., high-speed random access memory), non-volatile memory (e.g., flash memory), a combination of volatile and non-volatile memory, and/or any other type of memory. As illustrated in FIG. 14, the memory 1470 stores an operating system (OS) 1472. The OS 1472 includes instructions for handling basic system services and for performing hardware dependent tasks.

The memory 1470 also includes communication instructions 1474 to facilitate communicating with one or more additional devices; graphical user interface instructions 1476 to facilitate graphic user interface processing; image processing instructions 1478 to facilitate image-related processing and functions; input processing instructions 1480 to facilitate input-related (e.g., touch input) processes and functions; audio processing instructions 1482 to facilitate audio-related processes and functions; and camera instructions 1484 to facilitate camera-related processes and functions. The instructions described above are merely exemplary and the memory 1470 includes additional and/or other instructions in some embodiments. For instance, the memory for a smartphone may include phone instructions to facilitate phone-related processes and functions. Additionally, the memory may include instructions for a mapping and navigation application as well as other applications. The above-identified instructions need not be implemented as separate software programs or modules. Various functions of the mobile computing device can be implemented in hardware and/or in software, including in one or more signal processing and/or application specific integrated circuits.

While the components illustrated in FIG. 14 are shown as separate components, one of ordinary skill in the art will recognize that two or more components may be integrated into one or more integrated circuits. In addition, two or more components may be coupled together by one or more communication buses or signal lines. Also, while many of the functions have been described as being performed by one component, one of ordinary skill in the art will realize that the functions described with respect to FIG. 14 may be split into two or more integrated circuits.

B. Computer System

Figure 15:
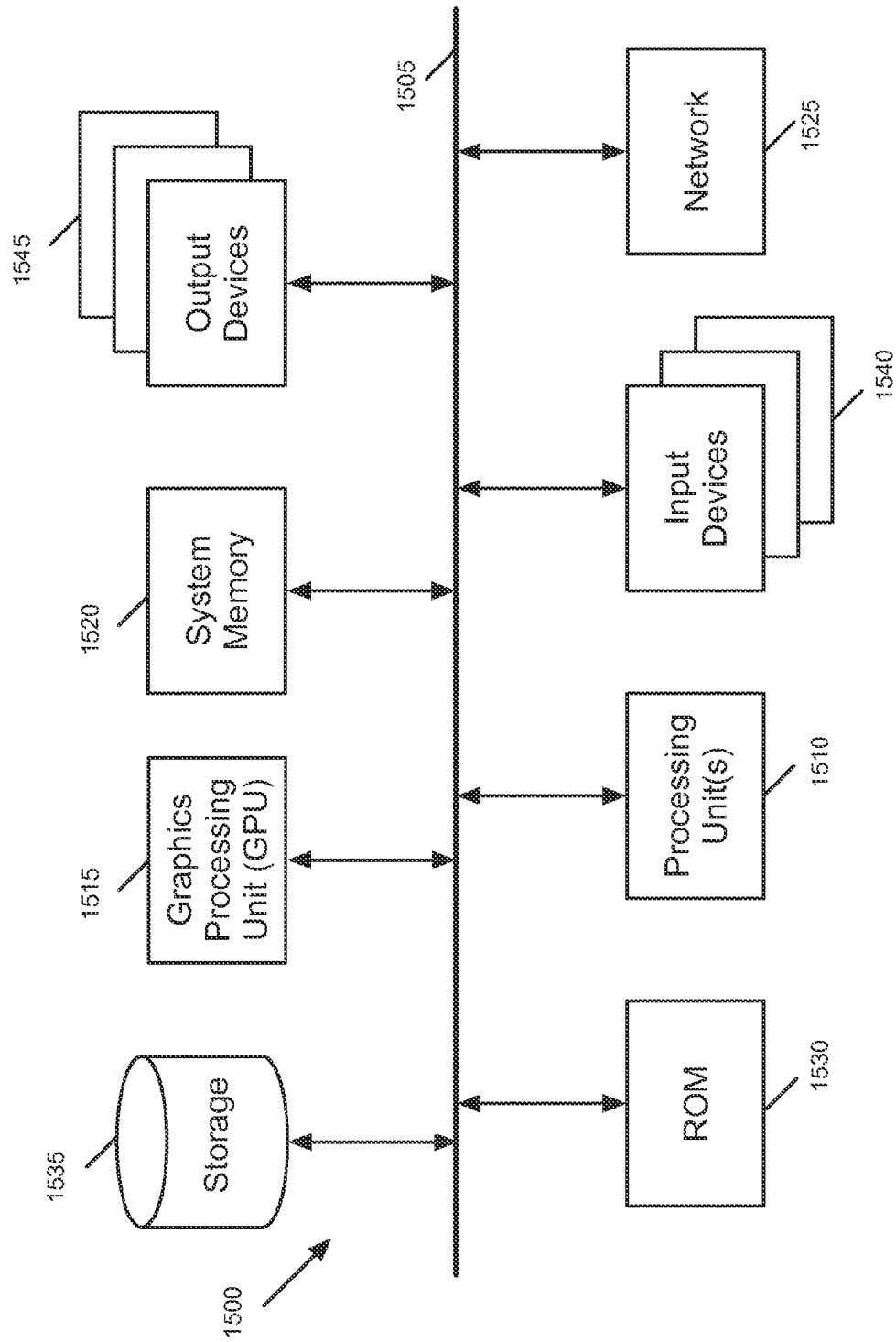
FIG. 15 conceptually illustrates another example of an electronic system 1500 with which some embodiments of the invention are implemented.

FIG. 15 conceptually illustrates another example of an electronic system 1500 with which some embodiments of the invention are implemented. The electronic system 1500 may be a computer (e.g., a desktop computer, personal computer, tablet computer, etc.), phone, PDA, or any other sort of electronic or computing device. Such an electronic system includes various types of computer readable media and interfaces for various other types of computer readable media. Electronic system 1500 includes a bus 1505, processing unit(s) 1510, a graphics processing unit (GPU) 1515, a system memory 1520, a network 1525, a read-only memory 1530, a permanent storage device 1535, input devices 1540, and output devices 1545.

The bus 1505 collectively represents all system, peripheral, and chipset buses that communicatively connect the numerous internal devices of the electronic system 1500. For instance, the bus 1505 communicatively connects the processing unit(s) 1510 with the read-only memory 1530, the GPU 1515, the system memory 1520, and the permanent storage device 1535.

From these various memory units, the processing unit(s) 1510 retrieves instructions to execute and data to process in order to execute the processes of the invention. The processing unit(s) may be a single processor or a multi-core processor in different embodiments. Some instructions are passed to and executed by the GPU 1515. The GPU 1515 can offload various computations or complement the image processing provided by the processing unit(s) 1510.

The read-only-memory (ROM) 1530 stores static data and instructions that are needed by the processing unit(s) 1510 and other modules of the electronic system. The permanent storage device 1535, on the other hand, is a read-and-write memory device. This device is a non-volatile memory unit that stores instructions and data even when the electronic system 1500 is off. Some embodiments of the invention use a mass-storage device (such as a magnetic or optical disk and its corresponding disk drive, integrated flash memory) as the permanent storage device 1535.

Other embodiments use a removable storage device (such as a floppy disk, flash memory device, etc., and its corresponding drive) as the permanent storage device. Like the permanent storage device 1535, the system memory 1520 is a read-and-write memory device. However, unlike storage device 1535, the system memory 1520 is a volatile read-and-write memory, such a random access memory. The system memory 1520 stores some of the instructions and data that the processor needs at runtime. In some embodiments, the invention's processes are stored in the system memory 1520, the permanent storage device 1535, and/or the read-only memory 1530. For example, the various memory units include instructions for processing multimedia clips in accordance with some embodiments. From these various memory units, the processing unit(s) 1510 retrieves instructions to execute and data to process in order to execute the processes of some embodiments.

The bus 1505 also connects to the input and output devices 1540 and 1545. The input devices 1540 enable the user to communicate information and select commands to the electronic system. The input devices 1540 include alphanumeric keyboards and pointing devices (also called "cursor control devices"), cameras (e.g., webcams), microphones or similar devices for receiving voice commands, etc. The output devices 1545 display images generated by the electronic system or otherwise output data. The output devices 1545 include printers and display devices, such as cathode ray tubes (CRT) or liquid crystal displays (LCD), as well as speakers or similar audio output devices. Some embodiments include devices such as a touchscreen that function as both input and output devices.

Finally, as shown in FIG. 15, bus 1505 also couples electronic system 1500 to a network 1525 through a network adapter (not shown). In this manner, the computer can be a part of a network of computers (such as a local area network ("LAN"), a wide area network ("WAN"), or an Intranet, or a network of networks, such as the Internet. Any or all components of electronic system 1500 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself. In addition, some embodiments execute software stored in programmable logic devices (PLDs), ROM, or RAM devices.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

V. Map Service Environment

Figure 16:
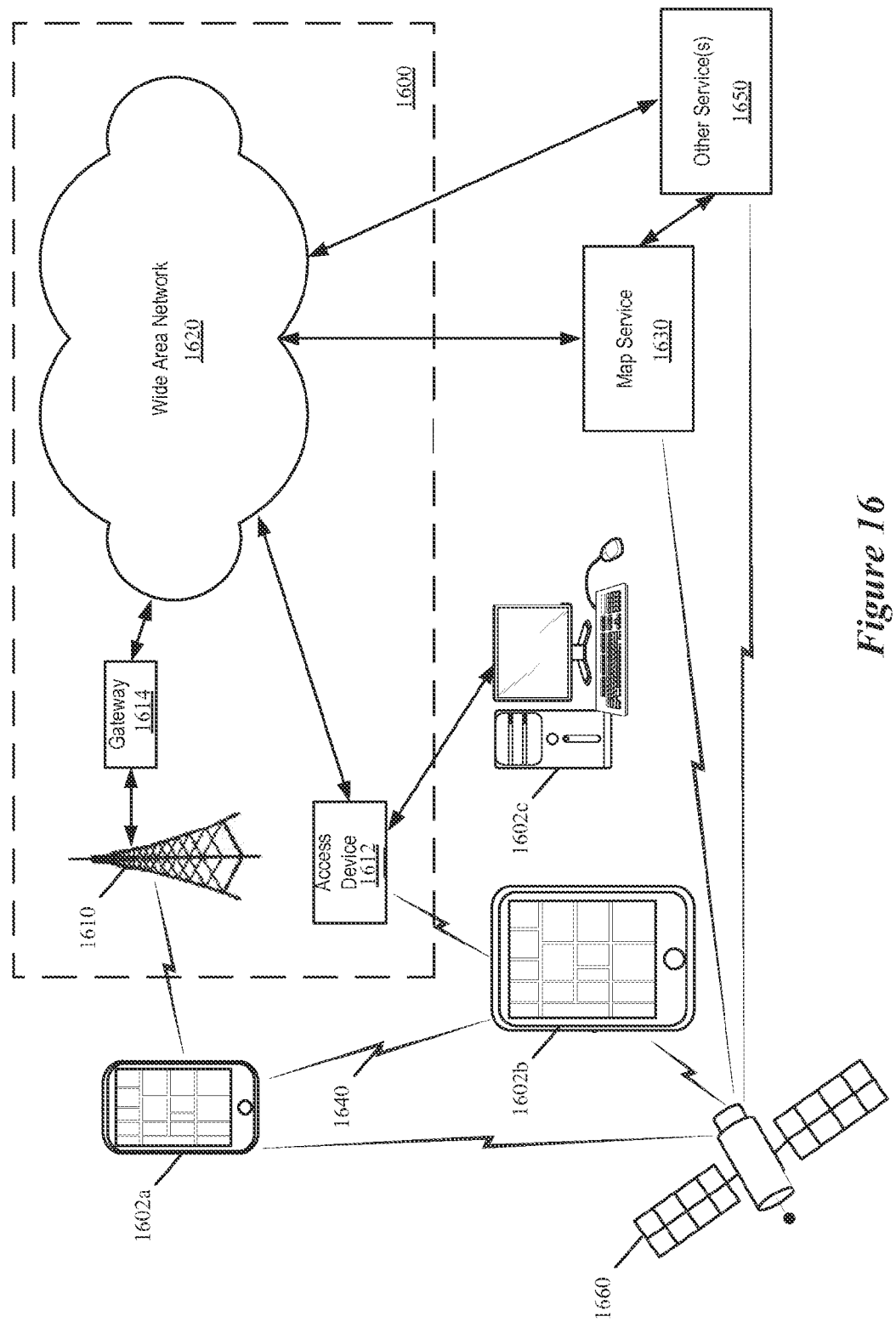
FIG. 16 illustrates a map service operating environment, according to some embodiments.

Various embodiments may operate within a map service operating environment. FIG. 16 illustrates a map service operating environment, according to some embodiments. A map service 1630 (also referred to as mapping service) may provide map services for one or more client devices 1602a-1602c in communication with the map service 1630 through various communication methods and protocols. A map service 1630 in some embodiments provides map information and other map-related data, such as two-dimensional map image data (e.g., aerial view of roads utilizing satellite imagery), three-dimensional map image data (e.g., traversable map with three-dimensional features, such as buildings), route and direction calculation (e.g., ferry route calculations or directions between two points for a pedestrian), real-time navigation data (e.g., turn-by-turn visual navigation data in two or three dimensions), location data (e.g., where is the client device currently located), and other geographic data (e.g., wireless network coverage, weather, traffic information, or nearby points-of-interest). In various embodiments, the map service data may include localized labels for different countries or regions; localized labels may be utilized to present map labels (e.g., street names, city names, points of interest) in different languages on client devices. Client devices 1602a-1602c may utilize these map services by obtaining map service data. Client devices 1602a-1602c may implement various techniques to process map service data. Client devices 1602a-1602c may then provide map services to various entities, including, but not limited to, users, internal software or hardware modules, and/or other systems or devices external to the client devices 1602a-1602c.

In some embodiments, a map service is implemented by one or more nodes in a distributed computing system. Each node may be assigned one or more services or components of a map service. Some nodes may be assigned the same map service or component of a map service. A load balancing node in some embodiments distributes access or requests to other nodes within a map service. In some embodiments a map service is implemented as a single system, such as a single server. Different modules or hardware devices within a server may implement one or more of the various services provided by a map service.

A map service in some embodiments provides map services by generating map service data in various formats. In some embodiments, one format of map service data is map image data. Map image data provides image data to a client device so that the client device may process the image data (e.g., rendering and/or displaying the image data as a two-dimensional or three-dimensional map). Map image data, whether in two or three dimensions, may specify one or more map tiles. A map tile may be a portion of a larger map image. Assembling together the map tiles of a map produces the original map. Tiles may be generated from map image data, routing or navigation data, or any other map service data. In some embodiments map tiles are raster-based map tiles, with tile sizes ranging from any size both larger and smaller than a commonly-used 256 pixel by 256 pixel tile. Raster-based map tiles may be encoded in any number of standard digital image representations including, but not limited to, Bitmap (.bmp), Graphics Interchange Format (.gif), Joint Photographic Experts Group (.jpg, .jpeg, etc.), Portable Networks Graphic (.png), or Tagged Image File Format (.tiff). In some embodiments, map tiles are vector-based map tiles, encoded using vector graphics, including, but not limited to, Scalable Vector Graphics (.svg) or a Drawing File (.drw). Some embodiments also include tiles with a combination of vector and raster data. Metadata or other information pertaining to the map tile may also be included within or along with a map tile, providing further map service data to a client device. In various embodiments, a map tile is encoded for transport utilizing various standards and/or protocols, some of which are described in examples below.

In various embodiments, map tiles may be constructed from image data of different resolutions depending on zoom level. For instance, for low zoom level (e.g., world or globe view), the resolution of map or image data need not be as high relative to the resolution at a high zoom level (e.g., city or street level). For example, when in a globe view, there may be no need to render street level artifacts as such objects would be so small as to be negligible in many cases.

A map service in some embodiments performs various techniques to analyze a map tile before encoding the tile for transport. This analysis may optimize map service performance for both client devices and a map service. In some embodiments, map tiles are analyzed for complexity, according to vector-based graphic techniques, and constructed utilizing complex and non-complex layers. Map tiles may also be analyzed for common image data or patterns that may be rendered as image textures and constructed by relying on image masks. In some embodiments, raster-based image data in a map tile contains certain mask values, which are associated with one or more textures. Some embodiments also analyze map tiles for specified features that may be associated with certain map styles that contain style identifiers.

Other map services generate map service data relying upon various data formats separate from a map tile in some embodiments. For instance, map services that provide location data may utilize data formats conforming to location service protocols, such as, but not limited to, Radio Resource Location services Protocol (RRLP), TIA 801 for Code Division Multiple Access (CDMA), Radio Resource Control (RRC) position protocol, or LTE Positioning Protocol (LPP). Embodiments may also receive or request data from client devices identifying device capabilities or attributes (e.g., hardware specifications or operating system version) or communication capabilities (e.g., device communication bandwidth as determined by wireless signal strength or wire or wireless network type).

A map service may obtain map service data from internal or external sources. For example, satellite imagery used in map image data may be obtained from external services, or internal systems, storage devices, or nodes. Other examples may include, but are not limited to, GPS assistance servers, wireless network coverage databases, business or personal directories, weather data, government information (e.g., construction updates or road name changes), or traffic reports. Some embodiments of a map service may update map service data (e.g., wireless network coverage) for analyzing future requests from client devices.

Various embodiments of a map service may respond to client device requests for map services. These requests may be a request for a specific map or portion of a map. Some embodiments format requests for a map as requests for certain map tiles. In some embodiments, requests also supply the map service with starting locations (or current locations) and destination locations for a route calculation. A client device may also request map service rendering information, such as map textures or style sheets. In at least some embodiments, requests are also one of a series of requests implementing turn-by-turn navigation. Requests for other geographic data may include, but are not limited to, current location, wireless network coverage, weather, traffic information, or nearby points-of-interest.

A map service, in some embodiments, analyzes client device requests to optimize a device or map service operation. For instance, a map service may recognize that the location of a client device is in an area of poor communications (e.g., weak wireless signal) and send more map service data to supply a client device in the event of loss in communication or send instructions to utilize different client hardware (e.g., orientation sensors) or software (e.g., utilize wireless location services or Wi-Fi positioning instead of GPS-based services). In another example, a map service may analyze a client device request for vector-based map image data and determine that raster-based map data better optimizes the map image data according to the image's complexity. Embodiments of other map services may perform similar analysis on client device requests and as such the above examples are not intended to be limiting.

Various embodiments of client devices (e.g., client devices 1602a-1602c) are implemented on different portable-multifunction device types. Client devices 1602a-1602c utilize map service 1630 through various communication methods and protocols. In some embodiments, client devices 1602a-1602c obtain map service data from map service 1630. Client devices 1602a-1602c request or receive map service data. Client devices 1602a-1602c then process map service data (e.g., render and/or display the data) and may send the data to another software or hardware module on the device or to an external device or system.

A client device, according to some embodiments, implements techniques to render and/or display maps. These maps may be requested or received in various formats, such as map tiles described above. A client device may render a map in two-dimensional or three-dimensional views. Some embodiments of a client device display a rendered map and allow a user, system, or device providing input to manipulate a virtual camera in the map, changing the map display according to the virtual camera's position, orientation, and field-of-view. Various forms and input devices are implemented to manipulate a virtual camera. In some embodiments, touch input, through certain single or combination gestures (e.g., touch-and-hold or a swipe) manipulate the virtual camera. Other embodiments allow manipulation of the device's physical location to manipulate a virtual camera. For instance, a client device may be tilted up from its current position to manipulate the virtual camera to rotate up. In another example, a client device may be tilted forward from its current position to move the virtual camera forward. Other input devices to the client device may be implemented including, but not limited to, auditory input (e.g., spoken words), a physical keyboard, mouse, and/or a joystick.

Some embodiments provide various visual feedback to virtual camera manipulations, such as displaying an animation of possible virtual camera manipulations when transitioning from two-dimensional map views to three-dimensional map views. Some embodiments also allow input to select a map feature or object (e.g., a building) and highlight the object, producing a blur effect that maintains the virtual camera's perception of three-dimensional space.

In some embodiments, a client device implements a navigation system (e.g., turn-by-turn navigation). A navigation system provides directions or route information, which may be displayed to a user. Some embodiments of a client device request directions or a route calculation from a map service. A client device may receive map image data and route data from a map service. In some embodiments, a client device implements a turn-by-turn navigation system, which provides real-time route and direction information based upon location information and route information received from a map service and/or other location system, such as Global Positioning Satellite (GPS). A client device may display map image data that reflects the current location of the client device and update the map image data in real-time. A navigation system may provide auditory or visual directions to follow a certain route.

A virtual camera is implemented to manipulate navigation map data according to some embodiments. Some embodiments of client devices allow the device to adjust the virtual camera display orientation to bias toward the route destination. Some embodiments also allow virtual camera to navigation turns simulating the inertial motion of the virtual camera.

Client devices implement various techniques to utilize map service data from map service. Some embodiments implement some techniques to optimize rendering of two-dimensional and three-dimensional map image data. In some embodiments, a client device locally stores rendering information. For instance, a client stores a style sheet which provides rendering directions for image data containing style identifiers. In another example, common image textures may be stored to decrease the amount of map image data transferred from a map service. Client devices in different embodiments implement various modeling techniques to render two-dimensional and three-dimensional map image data, examples of which include, but are not limited to: generating three-dimensional buildings out of two-dimensional building footprint data; modeling two-dimensional and three-dimensional map objects to determine the client device communication environment; generating models to determine whether map labels are seen from a certain virtual camera position; and generating models to smooth transitions between map image data. Some embodiments of client devices also order or prioritize map service data in certain techniques. For instance, a client device detects the motion or velocity of a virtual camera, which if exceeding certain threshold values, lower-detail image data is loaded and rendered of certain areas. Other examples include: rendering vector-based curves as a series of points, preloading map image data for areas of poor communication with a map service, adapting textures based on display zoom level, or rendering map image data according to complexity.

In some embodiments, client devices communicate utilizing various data formats separate from a map tile. For instance, some client devices implement Assisted Global Positioning Satellites (A-GPS) and communicate with location services that utilize data formats conforming to location service protocols, such as, but not limited to, Radio Resource Location services Protocol (RRLP), TIA 801 for Code Division Multiple Access (CDMA), Radio Resource Control (RRC) position protocol, or LTE Positioning Protocol (LPP). Client devices may also receive GPS signals directly. Embodiments may also send data, with or without solicitation from a map service, identifying the client device's capabilities or attributes (e.g., hardware specifications or operating system version) or communication capabilities (e.g., device communication bandwidth as determined by wireless signal strength or wire or wireless network type).

FIG. 16 illustrates one possible embodiment of an operating environment 1600 for a map service 1630 and client devices 1602a-1602c. In some embodiments, devices 1602a, 1602b, and 1602c communicate over one or more wire or wireless networks 1610. For example, wireless network 1610, such as a cellular network, can communicate with a wide area network (WAN) 1620, such as the Internet, by use of gateway 1614. A gateway 1614 in some embodiments provides a packet oriented mobile data service, such as General Packet Radio Service (GPRS), or other mobile data service allowing wireless networks to transmit data to other networks, such as wide area network 1620. Likewise, access device 1612 (e.g., IEEE 802.11g wireless access device) provides communication access to WAN 1620. Devices 1602a and 1602b can be any portable electronic or computing device capable of communicating with a map service. Device 1602c can be any non-portable electronic or computing device capable of communicating with a map service.

In some embodiments, both voice and data communications are established over wireless network 1610 and access device 1612. For instance, device 1602a can place and receive phone calls (e.g., using voice over Internet Protocol (VoIP) protocols), send and receive e-mail messages (e.g., using Simple Mail Transfer Protocol (SMTP) or Post Office Protocol 3 (POP3)), and retrieve electronic documents and/or streams, such as web pages, photographs, and videos, over wireless network 1610, gateway 1614, and WAN 1620 (e.g., using Transmission Control Protocol/Internet Protocol (TCP/IP) or User Datagram Protocol (UDP)). Likewise, in some implementations, devices 1602b and 1602c can place and receive phone calls, send and receive e-mail messages, and retrieve electronic documents over access device 1612 and WAN 1620. In various embodiments, any of the illustrated client device may communicate with map service 1630 and/or other service(s) 1650 using a persistent connection established in accordance with one or more security protocols, such as the Secure Sockets Layer (SSL) protocol or the Transport Layer Security (TLS) protocol.

Devices 1602a and 1602b can also establish communications by other means. For example, wireless device 1602a can communicate with other wireless devices (e.g., other devices 1602b, cell phones, etc.) over the wireless network 1610. Likewise devices 1602a and 1602b can establish peer-to-peer communications 1640 (e.g., a personal area network) by use of one or more communication subsystems, such as Bluetooth® communication from Bluetooth Special Interest Group, Inc. of Kirkland, Wash. Device 1602c can also establish peer to peer communications with devices 1602a or 1602b (not shown). Other communication protocols and topologies can also be implemented. Devices 1602a and 1602b may also receive Global Positioning Satellite (GPS) signals from GPS satellites 1660.

Devices 1602a, 1602b, and 1602c can communicate with map service 1630 over the one or more wire and/or wireless networks, 1610 or 1612. For instance, map service 1630 can provide a map service data to rendering devices 1602a, 1602b, and 1602c. Map service 1630 may also communicate with other services 1650 to obtain data to implement map services. Map service 1630 and other services 1650 may also receive GPS signals from GPS satellites 1660.

In various embodiments, map service 1630 and/or other service(s) 1650 are configured to process search requests from any of client devices. Search requests may include but are not limited to queries for business, address, residential locations, points of interest, or some combination thereof. Map service 1630 and/or other service(s) 1650 may be configured to return results related to a variety of parameters including but not limited to a location entered into an address bar or other text entry field (including abbreviations and/or other shorthand notation), a current map view (e.g., user may be viewing one location on the multifunction device while residing in another location), current location of the user (e.g., in cases where the current map view did not include search results), and the current route (if any). In various embodiments, these parameters may affect the composition of the search results (and/or the ordering of the search results) based on different priority weightings. In various embodiments, the search results that are returned may be a subset of results selected based on specific criteria include but not limited to a quantity of times the search result (e.g., a particular point of interest) has been requested, a measure of quality associated with the search result (e.g., highest user or editorial review rating), and/or the volume of reviews for the search results (e.g., the number of times the search result has been review or rated).

In various embodiments, map service 1630 and/or other service(s) 1650 are configured to provide auto-complete search results that are displayed on the client device, such as within the mapping application. For instance, auto-complete search results may populate a portion of the screen as the user enters one or more search keywords on the multifunction device. In some cases, this feature may save the user time as the desired search result may be displayed before the user enters the full search query. In various embodiments, the auto complete search results may be search results found by the client on the client device (e.g., bookmarks or contacts), search results found elsewhere (e.g., from the Internet) by map service 1630 and/or other service(s) 1650, and/or some combination thereof. As is the case with commands, any of the search queries may be entered by the user via voice or through typing. The multifunction device may be configured to display search results graphically within any of the map display described herein. For instance, a pin or other graphical indicator may specify locations of search results as points of interest. In various embodiments, responsive to a user selection of one of these points of interest (e.g., a touch selection, such as a tap), the multifunction device is configured to display additional information about the selected point of interest including but not limited to ratings, reviews or review snippets, hours of operation, store status (e.g., open for business, permanently closed, etc.), and/or images of a storefront for the point of interest. In various embodiments, any of this information may be displayed on a graphical information card that is displayed in response to the user's selection of the point of interest.

In various embodiments, map service 1630 and/or other service(s) 1650 provide one or more feedback mechanisms to receive feedback from client devices 1602a-1602c. For instance, client devices may provide feedback on search results to map service 1630 and/or other service(s) 1650 (e.g., feedback specifying ratings, reviews, temporary or permanent business closures, errors etc.); this feedback may be used to update information about points of interest in order to provide more accurate or more up-to-date search results in the future. In some embodiments, map service 1630 and/or other service(s) 1650 may provide testing information to the client device (e.g., an A/B test) to determine which search results are best. For instance, at random intervals, the client device may receive and present two search results to a user and allow the user to indicate the best result. The client device may report the test results to map service 1630 and/or other service(s) 1650 to improve future search results based on the chosen testing technique, such as an A/B test technique in which a baseline control sample is compared to a variety of single-variable test samples in order to improve results.

While the invention has been described with reference to numerous specific details, one of ordinary skill in the art will recognize that the invention can be embodied in other specific forms without departing from the spirit of the invention. For instance, many of the figures (e.g., FIGS. 3 and 4) illustrate various touch gestures (e.g., taps, double taps, swipe gestures, press and hold gestures, etc.). However, many of the illustrated operations could be performed via different touch gestures (e.g., a swipe instead of a tap, etc.) or by non-touch input (e.g., using a cursor controller, a keyboard, a touchpad/trackpad, a near-touch sensitive screen, etc.). In addition, a number of the figures conceptually illustrate processes (i.e., FIGS. 2 and 13). The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process.

What is claimed is:

1. A non-transitory machine readable medium storing a program for execution by at least one processing unit of a device, the program comprising sets of instructions for:
    identifying (i) a route being navigated by the device; (ii) a position of the device along the route based on data from a position sensor; and (iii) a plurality of roads on or near the navigated route or device, and iv) a plurality of road sign display schemes each defining positions of the road signs to be displayed on a navigation presentation;
    automatically selecting a road sign display scheme from the plurality of road sign display schemes based in part on the position of the device along the route; and
    displaying, on a display screen associated with the device, the navigation presentation comprising (i) a plurality of navigation banners, each of which provides navigation instructions for a juncture along the identified route, (ii) a set of road signs for the identified plurality of roads, the set of road signs being positioned on the display based on the selected road sign display scheme, and (iii) the position of the device along the route.

2. The non-transitory machine readable medium of claim 1, the program further comprising a set of instructions for:
    grouping the identified roads into a plurality of tiers based in part on the position of the device along the route, wherein the plurality of different tiers comprises first, second, and third tiers; and
    including roads that are categorized as first tier roads in the subset before including roads that are categorized as second tier roads in the subset.

3. The non-transitory machine readable medium of claim 2, wherein the set of instructions for identifying the road sign display scheme further comprises a set of instructions for:
    identifying a first subset of the navigation presentation, the first subset including one or more of the plurality of roads, wherein a number of road signs associated with the first subset exceeds a threshold;
    identifying a second subset of the navigation presentation, the second subset including the one or more of the plurality of roads; and
    positioning at least one road sign of the set of road signs in the second subset of the navigation presentation.

4. The non-transitory machine readable medium of claim 3, the program further comprising a set of instructions for:
    identifying that the number of road signs associated with the first subset exceeds a threshold; and
    declining to display the at least one road sign.

5. The non-transitory machine readable medium of claim 1, wherein the set of instructions for grouping the identified roads further comprises a set of instructions for grouping all roads on the navigated route as first tier roads.

6. The non-transitory machine readable medium of claim 1, wherein the set of instructions for grouping the identified roads further comprises a set of instructions for grouping all roads that intersect or overlap with the navigated route as second tier roads.

7. The non-transitory machine readable medium of claim 1, the program further comprising a set of instructions for identifying a set of roads that are one or two hops away from the second tier roads, wherein the set of instructions for grouping the identified roads further comprises grouping the roads in the identified set of roads as third tier roads.

8. The non-transitory machine readable medium of claim 1, the program further comprising a set of instructions for including the first tier roads in the subset prior to including any of the second tier roads in the subset and including the second tier roads in the subset prior to including any of the third tier roads in the subset.

9. The non-transitory machine readable medium of claim 1, wherein the set of instructions for grouping the identified roads further comprises a set of instructions for grouping all roads that intersect or overlap with the second tier roads as third tier roads.

10. The non-transitory machine readable medium of claim 1, the program further comprising sets of instructions for:
    for the subset, including a first group of roads in the subset from the first set of tiers up to the maximum number of roads based on a selection criteria; and
    when the selection of the first group based on the selection criteria produces less than the minimum number of identified roads in the first group, including a second group of roads for the subset from the second set of tiers.

11. The non-transitory machine readable medium of claim 1, wherein displaying the navigation presentation comprises providing information regarding roads along the route while reducing visual clutter.

12. A non-transitory machine readable medium storing a program for execution by at least one processing unit of a device, the program comprising sets of instructions for:
  identifying (i) a route being navigated by the device; (ii) a position of the device along the route based on data from a position sensor; (iii) a plurality of roads on or near the navigated route or device, and iv) a plurality of road sign display schemes each defining positions of the road signs to be displayed on a navigation presentation;
  automatically selecting a road sign display scheme from the plurality of road sign display schemes based in part on the position of the device along the route; and
  displaying, on a display screen associated with the device, a navigation presentation comprising (i) a plurality of navigation banners, each of which provides navigation instructions for a juncture along the identified route, (ii) a set of road signs for a subset of the identified roads, the set of road signs being positioned on the display based on the selected road sign display scheme, and (iii) the position of the device along the route.

13. The non-transitory machine readable medium of claim 12, the program comprising sets of instructions for:
  grouping the identified roads into a plurality of tiers with
    (i) roads on the navigated route in a first tier,
    (ii) roads that intersect or overlap with the navigated route in a second tier,
    (iii) roads that intersect or overlap with the second tier roads in a third tier when the roads are within a threshold distance of the navigated route or when the roads are reachable by the device within a threshold time, and
    (iv) roads that intersect or overlap with the second tier roads in a fourth tier when the roads are not within the threshold distance of the navigated route or when the roads are not reachable by the device within the threshold time; and
  performing a filtering operation when a number of roads in a set of one or more tiers is more than a predefined maximum number.

14. The non-transitory machine readable medium of claim 13, wherein the set of instructions for performing the filtering operation comprises a set of instructions for performing the filtering operation by selecting arterial roads or freeways over local or smaller roads.

15. For a navigation application executing on a device, a method comprising:
  identifying (i) different junctions along a route being navigated by the device; (ii) a position of the device along the route based on data from a position sensor; (iii) different roads on or near the navigated route or device, and iv) a plurality of road sign display schemes each defining positions of the road signs to be displayed on a navigation presentation;
  automatically selecting a road sign display scheme from the plurality of road sign display schemes based in part on the position of the device along the route; and
  rendering a view of a navigation presentation by displaying, on a display screen associated with the device:
    navigation banners, each of which providing navigation instructions for a corresponding identified junction along the navigated route;
    road signs for a subset of the identified roads, the set of road signs being positioned on the display based on the selected road sign display scheme; and
    the position of the device along the route.

16. The method of claim 15, further comprising:
  categorizing the identified roads into a plurality of tiers, based in part on the position of the device along the route, with
    (i) roads on the navigated route in a first tier,
    (ii) roads that intersect or overlap with the navigated route in a second tier, and
    (iii) roads that intersect or overlap with the second tier roads in a third tier; and
  wherein rendering the view comprises distributing the road signs on different sides about the navigated route.

17. The method of claim 15, wherein rendering the view comprises rendering a three-dimensional (3D) perspective view of the navigation presentation.

18. The method of claim 15, further
  identifying a first subset of the navigation presentation, the first subset including one or more of the plurality of roads, wherein a number of road signs associated with the first subset exceeds a threshold;
  identifying a second subset of the navigation presentation, the second subset including the one or more of the plurality of roads; and
  positioning at least one road sign of the set of road signs in the second subset of the navigation presentation.

19. The method of claim 18, further comprising
  identifying that the number of road signs associated with the first subset exceeds a threshold; and
  declining to display the at least one road sign.

20. The method of claim 19, further comprising including third tier roads in the subset only when the number of included first and second tier roads is less than the predefined maximum number.

* * * * *